United States Patent [19]
Hosokawa et al.

[11] Patent Number: 5,114,513
[45] Date of Patent: May 19, 1992

[54] OPTICAL DEVICE AND MANUFACTURING METHOD THEREOF

[75] Inventors: Hayami Hosokawa, Yawata; Tsukasa Yamashita, Nara, both of Japan

[73] Assignee: Omron Tateisi Electronics Co., Kyoto, Japan

[21] Appl. No.: 426,274

[22] Filed: Oct. 25, 1989

[30] Foreign Application Priority Data

Oct. 27, 1988 [JP] Japan .................................. 63-269549
Mar. 13, 1989 [JP] Japan .................................. 1-60278
Mar. 16, 1989 [JP] Japan .................................. 1-65276

[51] Int. Cl.⁵ .............................................. C25D 5/20
[52] U.S. Cl. .................................. 156/150; 430/296; 430/321; 430/945; 427/155; 427/162; 427/248.1; 156/241; 156/272.2; 156/275.5

[58] Field of Search ............... 430/296, 945, 321; 427/248.1, 162, 155; 156/272.2, 275.5, 275.7, 241, 242, 150

[56] References Cited

U.S. PATENT DOCUMENTS 4,911,968  3/1990  Higasihara et al. .................. 428/65

Primary Examiner—Ellis P. Robinson
Assistant Examiner—Jacqueline Weddington
Attorney, Agent, or Firm—Dickstein, Shapiro & Morin

[57] ABSTRACT

An optical device manufacturing method includes a step of accumulating an optical device inorganic material on a stamper by use of a vacuum thin-film growing method, and a step of removing the accumulated material from the stamper, thereby producing an optical device.

20 Claims, 21 Drawing Sheets

Fig. 1a  PRIOR ART
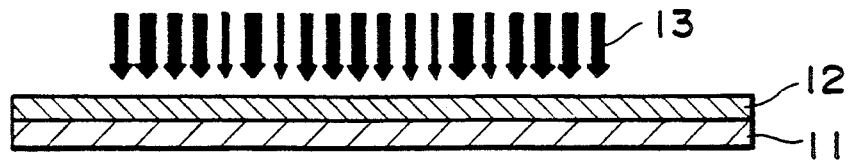
Fig. 1b  PRIOR ART
Fig. 1c  PRIOR ART
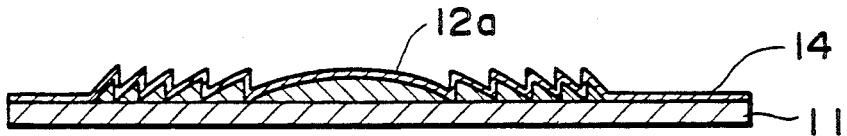
Fig. 1d  PRIOR ART
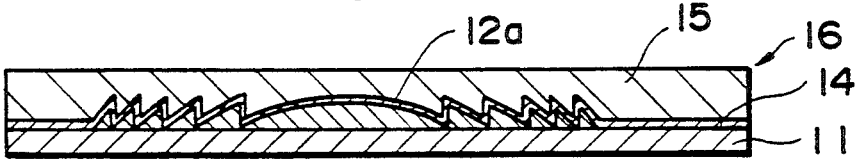
Fig. 1e  PRIOR ART
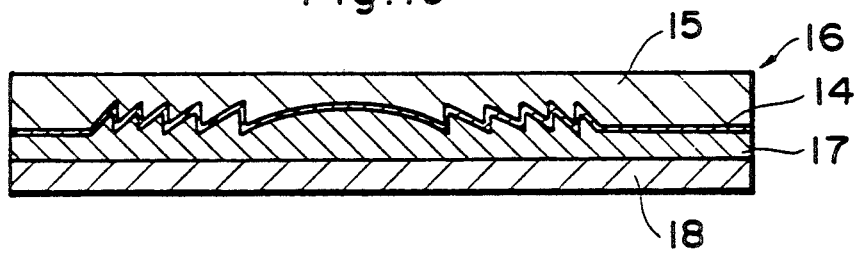

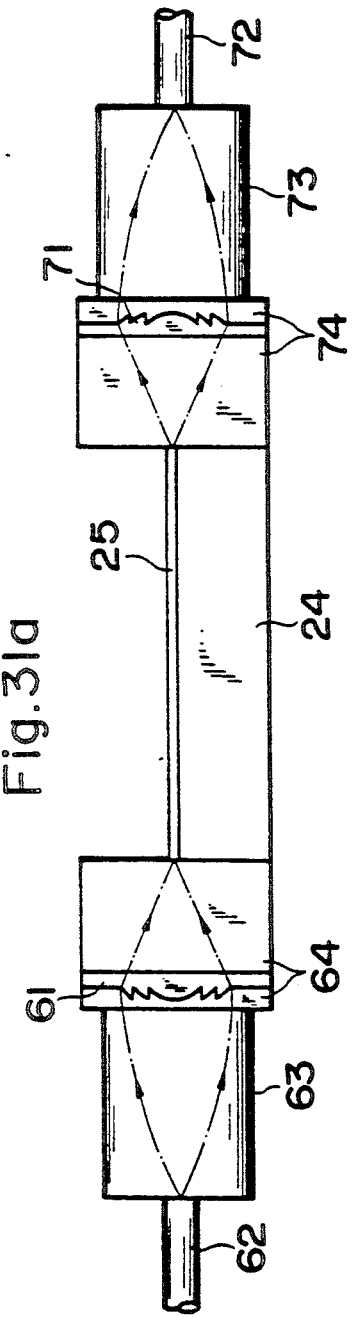
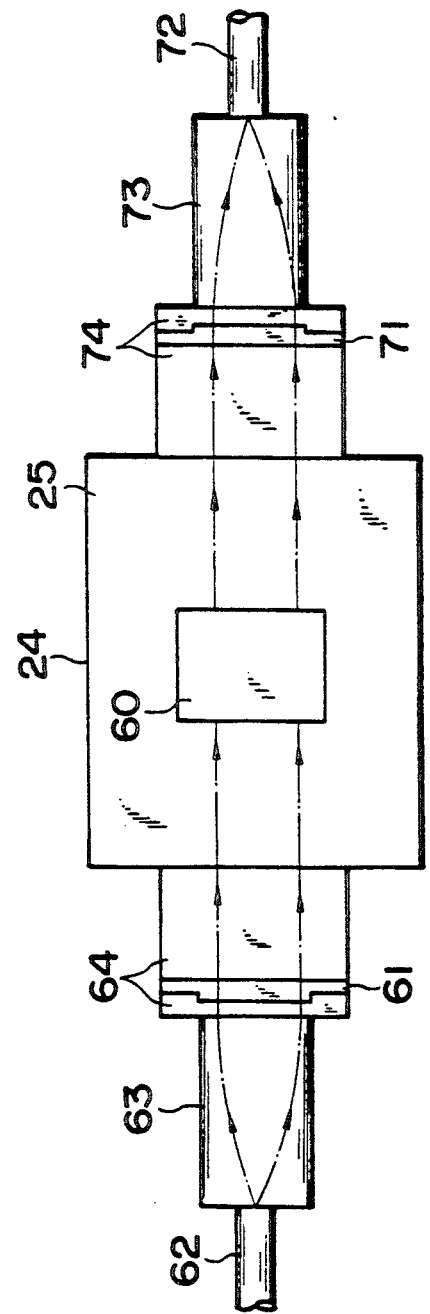

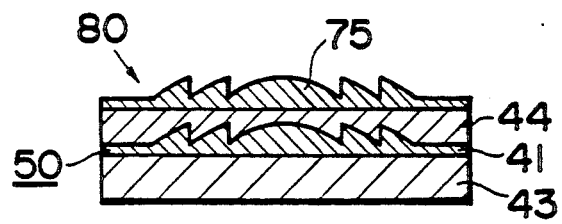
Fig. 32
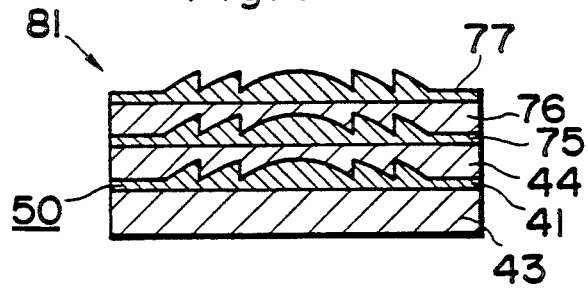
Fig. 33
Fig. 34
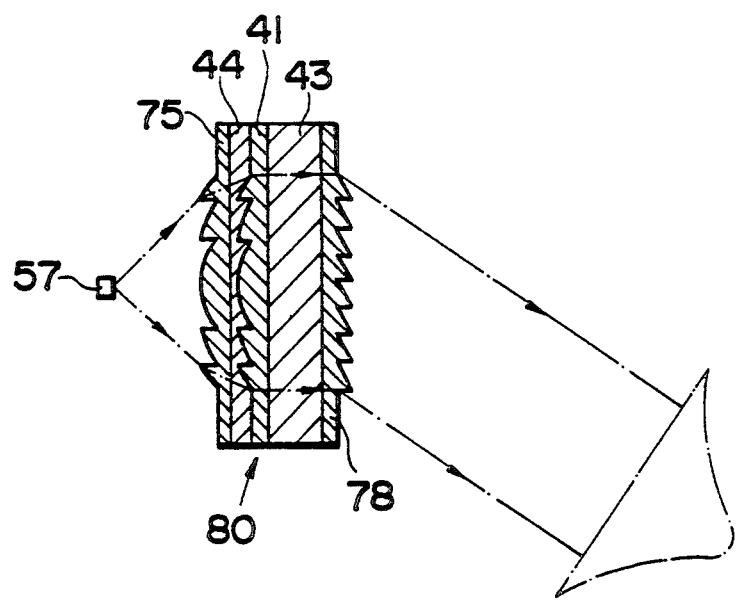

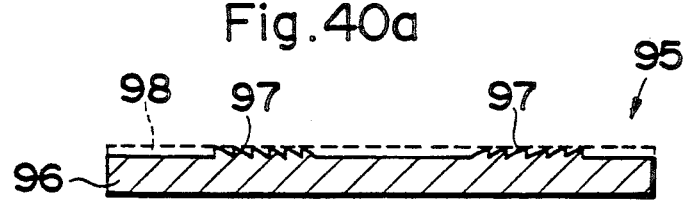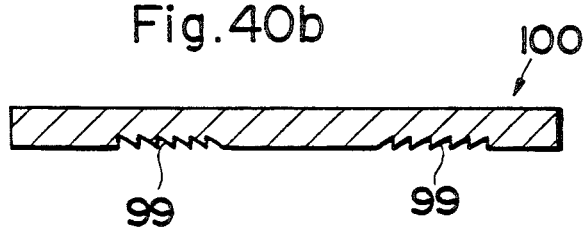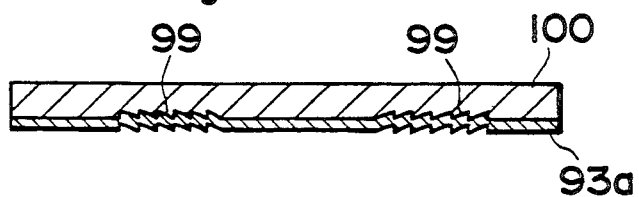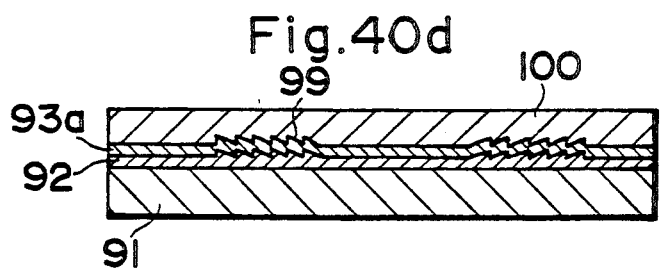

OPTICAL DEVICE AND MANUFACTURING METHOD THEREOF

BACKGROUND OF THE INVENTION

1. Field of the Invention

The present invention relates to an optical device, for example, a micro-Fresnel lens, a flat micro-lens, a grating device, an optical coupler, or an optical circuit and to a manufacturing method of the same.

2. Description of the Prior Art

FIGS. 1a to 1e are process diagrams schematically showing a conventional manufacturing process to fabricate an optical device (Fresnel lens).

On a surface of a silicon, Si substrate 11, an electron beam resisit (e.g. CMS-EX(R): Negative-type regist) 12 is uniformly coated such that an electron beam 13 is thereafter irradiated onto the resist 12 by use of an electron beam writing apparatus to draw a predetermined male stamper pattern (FIG. 1a). Thereafter, the resist 12 is developed. As a result, a predetermined lens male stamper pattern 12a associated with the remaining resist layer remains on the substrate 11 (FIG. 1b). When the amount of irradition of the electron beam is controlled depending on locations of the electron beam resist, the film thickness remaining after the development varies according to the locations in association of the amount of the irradited electron beam. On the substrate 11 having the remaining resist 12a of the predetermined lens male stamper pattern thus formed, gold is evaporated to form an electrode layer 14 (FIG. 1c). Furthermore, chromium is plated thereon to form a plate layer 15 (FIG. 1d). Thereafter, the remaining resist layer 12a and the silicon substrate 11, if necessary, are dissolving by use of an organic solvent, an etching agent, or the like to be removed so as to form a female stamper (an optical device stamper of a Fresnel lens or the like) 16.

A Fresnel lens is manufactured by use of the female stamper 16 thus prepared. Namely, by injecting an optical device organic material (ultraviolet (UV) setting or hardering resin or agent) 17 into a space between the male stamper 16 and a glass substrate 18 and then an ultraviolet ray is irradiated onto the organic material 17 by means of an ultiraviolet (UV) lamp 19 to solidfy the material 17, which is finally removed from the female stamper 16 to attain a plastic Fresnel lens (FIG. 1e). By use of the female stamper 16, a plurality of plastic lenses can be manufactured through the similar procduction process.

Incidentally, there have already been known a method of fabricating a stamper with a material transparent with respect to an ultraviolet ray (JP-A-1-180502) and a method in which a resin is injected onto a stamper without necessarily using an ultraviolet setting resin (JP-A-62-161532, JP-A-161533).

In accordance with the conventional optical device manufacturing method, since the optical device material is restricted by an organic material such as a plastic substance, there has been a disadvantage, for example, that the usage of the produced optical device is limited. For example, since the organic materials for this purpose develop a refractive index of only about 1.5, the degree of freedom is narrowed for the design of the device. In addition, since the wavelength of light transmitting therethrough is in a range from about 0.4 micrometer to about two micrometers, the application field of the manufactured optical device is restricted. Furthermore, in the device production, air bubbles are likely to be produced and to enter the organic material, which leads to a problem that a satisfactory transcription cannot be developed when reproducing a fine pattern in a submicron range. Moreover, the refractive index greatly varies depending on temperatures, namely, "deviation" of the refractive index and a double refraction are likely to take place, which may possibly lower the performance of the optical device. In addition, when an organic material is used as the optical device material, the large variation in the volume occurs with a change of temperature, which leads to a deteriorated temperature characteristic. Furthermore, there exists a disadvantage that the material swells due to the characteristic of the organic material, namely, owing to a high water absorption and a high hygroscopic property. Moreover, the heat resistivity is also unsatisfactory. As a result, in this situation, an ideal optical device cannot be produced.

In the conventional optical devices described above, for example, a flat micro-lens and a grating device, a lens layer or a grating layer is disposed on a glass substrate, namely, a fine surface having depressions and projections is exposed on the lens or grating layer. Consequently, the lens or grating layer surface is constantly brought into contact with the environmental air, and hence a satisfactory resistivity against dusts and humidity cannot be developed. Namely, dirts and dusts are fixed onto the fine surface of the lens layer, which leads to a disadvantage, for example, the lens characteristic is deteriorated.

In addition, although optical devices above have flat surfaces on the side of the glass substrate, the devices have fine shaped surface on the lens surface side. In consequence, a surface of another member can be brought into contact only with the flat surface side of the glass substrate, which lowers the degree of intergation when the device is used. For example, in the conventional optical fiber coupler of FIG. 2, at top end portions of two optical fibers 20, connectors 22 are respectively attached such that these connectors 22 are inserted into a guide 21 so as to be fixedly secured thereon. Each connector 22 is provided with a Fresnel lens 23. These lenses 23 are linked to each other on the respective flat surfaces (JP-A-63-33717). The lenses 23 are disposed to oppose to the ends of the optical fiber 20 via a space. In this optical fiber coupler, the light propagates through the air and hence the coupler is unstable against a temperature change, namely, the coupler is not satisfactorily stable against changes in the environmental conditions. Moreover, there exists disadvantages, for example, since the Fresnel lenses are retained by a guide, the structure is also unstable.

On the other hand, as methods of coupling lights incident to a two-dimensional optical waveguide (layer) formed on a substrate, there have been known an objective method in which, as shown in FIG. 3, a light focused through an objective 27 enters an end surface of an optical waveguide 25 on a substrate 24 and an end coupling method in which, as shown in FIG. 4, an end surface of an optical fiber 28 is disposed in the proximity of an optical waveguide 25 or is fixedly attached onto the waveguide 25, or as shown in FIG. 5, a semiconductor laser 29 as a light source is disposed in the proximity of an optical waveguide 25 or is fixedly attached onto the waveguide 25.

However, in accordance with these optical coupling methods, the light entering an end surface of the optical waveguide 25 propagates and disperses through the waveguide 25. Consequently, the dispersed light is required to be collimated in the two-dimensional (2-D) optical waveguide 25. For this purpose, in the optical waveguide 25, a waveguide lens 26 is disposed as a collimator lens. However, since the waveguide lens 26 has not a satisfactory optical conversion or collimation efficiency, the incident light cannot be effectively utilized. Namely, the optical device including the optical waveguide 25 is attended with a considerable loss. Moreover, the size of the device is increased by the focal distance of the waveguide lens 26. In addition, in order to manufacture the waveguide lens 26 in the optical waveguide 25, it is necessary to employ manufacturing processes such as a sputtering, an etching, and a proton exchange and the manufacturing of the waveguide lens 26 is complicated. This reduces the yielding of the devices and hence soars the production cost. Furthermore, since the waveguide lens 26 is attended with a small allowance of positioning discrepancy or shift, the fabrication of the waveguide lens 26 is attrended with difficulties.

As described above, since there exist many problems due to the waveguide lens, there has been required a development of an optical coupler unnecessitating the waveguide lens.

In addition, as the conventional composite optical devices, for example, a composite grating device there has been known a device comprising a grating layer formed on the front and rear surfaces of a glass substrate and a device having a structure in which two glass substrates each having a surface on which a grating layer is formed are fixed to each other on a rear side thereof.

In the composite grating device of the prior art technology, the number of grating layers to form the composite device is limited to two, which leads to a disadvantage that the application fields are restricted. Furthermore, the composite grating device does not have a flat surface portion and hence cannot be employed to produce an intergrated circuit together with other optical devices. Moreover, two glass substrates each having a grating layer cannot be easily fixed to each other by aligning the optical axis of each grating at a high precision.

Incidentally, there has beed desired a Fresnel lens with a high numerical aperture (NA) as an objective for an optical pickup or a lens for a laser diode collimation. However, in a Fresnel lens, as the numerical aperture (NA) is increased, the minimum cycle or interval of the grating is reduced. The relationship between the numerical aperture and the minimum interval is represented as follows.

$$\Lambda = \lambda/NA$$

Where, $\Lambda$ is a minimum interval and $\lambda$ indicates a wavelength.

An objective for a pickup requires a numerical aperture value not less than 0.45, and hence the minimum interval is to be about 1.7 micrometers. In consequence, the manufacturing precision is critical and there exist problems of the reduced efficiency due to the manufacturing error and of the occurrence of on-axis aberration (an aberration causes due to a discrepancy between the optical axis of the lens and the propagation direction of the incident light). Furthermore, as the interval is decreased, a discrepancy from a phase shift function (theoretical error) is increased which leads to a deterioration of efficiency. As described above, it has been quite difficult to efficiently produce a high-NA Fresnel lens with a low aberration. Moreover, since the Fresnel lens is attended with a large off-axis aberration (which occurs in a location other than locations on the optical axis), the optical axis alignment is considerably difficult. For example, for a Fresnel lens having NA=0.45, in order to set the off-axis aberration to 0.01 or less, the angular discrepancy is required to be 0.016 degree or less (FIG. 35). FIG. 35 is a graph in which the numerical aperture (NA) and the angular discrepancy are respectively indicated along the abscissa an ordinate with a wave front aberration set as a parameter.

In consequence, heretofore, in an LD collimator having a beam shaping function primarily employed as a light source of a write-type optical disk, there is included, as shown in FIG. 6, a combination of a high-NA collimator lens 31 and a beam shaping prism 32. Lights from a semiconductor laser light source 33 disposed in the proximity of the focal point are collimated by the collimator lens 31 such that the collimated light beam is shaped into a circular contour by the beam shaping prism 32. However, in this constitution, the high-collimator lens and the beam shaping prism are expensive; moreover, the size of the collimator itself is disadvantageously increased.

Recently, in various optical devices, an optical circuit has been broadly adopted in which as shown in FIG. 7, an optical circuit device such as grating couplers 34 are disposed in an optical waveguide 25 on a substrate 24. For example, according to the constitution of this optical circuit, a light incident to a grating coupler 34 on one side is passed via an optical waveguide 25 so as to be emitted from a grating cupler 34 on the other side. In an optical device of this kind, after the optical waveguide is manufactured on the substrate, a complex production steps incuding the dry etching and the proton exchange are carried out to form the optical circuit devices. Consequently, the production of the optical circuit requires a considerable amount of work and time, which leads to problems that the mass production is difficult and that the production cost is soared.

Furthermore, because of the complicated manufacturing processes, the reproducibility of the devices is lowered and hence the performance of the products is decreased.

In addition, since the optical circuit elements or devices are fabricated after the optical waveguide 25 is manufactured, there has been problems that surfaces of the optical waveguide 25 are damages during the production and that the optical circuit devices cannot be easily aligned onto the optical waveguide 25.

SUMMARY OF THE INVENTION

It is therefore an object of the present invention to provide an optical device manufacturing method in which an inorganic substance can be employed as the optical device material to produce an ideal optical device.

Another object of the present invention is to provide an optical device of which two main surfaces are flat and which is satisfactorily resistive against various environments associated with the dusts and humidity. The device can be manufactured with a high integration degree.

Still another object of the present invention is to provide an optical coupler to be employed in a two-dimensional (2-D) optical waveguide unnecessitating a waveguide lens.

Further another object of the present invention is to provide a composite optical device which develops a high numercal aperture and which can be employed to produce an integrated circuit together with other optical devices.

Another object of the present invention is provide a lens with a high numerical aperture, which cannot be easily obtained by use of a lens in the prior art technology, by use of substantially a grating lens in which an operation to fix grating lenses to each other on an optical axis with a high precision is unnecessitated.

Still another object of the present invention is to provide an optical circuit with a high quality capable of being easily produced.

The optical device manufacturing method in accordance with the present invention is characterized in that on a stamper, an optical device inorganic material is piled by use of a vacuum thin-film growing or forming process and then the piled inorganic material is peeled off from the stamper, thereby fabricating an optical device.

In the optical device manufacturing method in accordance with the present invention, a stamper of an optical device (e.g. a Fresnel lens) is prepared so as to accumulate thereon an optical device inorganic material by use of a vacuum thin-film growing process (e.g. a vacuum evaporation process). On a surface of the piled inorganic material, a glass substrate is then fixedly adhered via an adhesive resin (ultraviolet (UV)-setting substance). Thereafter, an ultraviolet ray is irradiated onto the resin so as to solidfy the resin, which is then removed from the stamper, thereby forming an optical device (Fresnel lens).

In accordance with the optical device manufacturing method, the device material need only be handled to form a film or layer through the vacuum thin-film growing method, and hence almost any inorganic substances may be used as the device material. In consequence, the selectivity of the optical device material is increased. For example, depending on utilization purposes, a material having a wide range of transmission wavelendths and a material with a high refractive index may be selected for the device material. Furthermore, owing to the characteristics of inorganic substances, there is not produced a gas, and consequently the volume change and the refractive index variation are small with a change in the temperature. Moreover, the water absorbing property and the humidity absorbing property are small and a high heat resistivity is developed. Consequently, the inorganic substances can be used to produce ideal optical devices. In addition, according to this optical device manufacturing method, because of usage of the vacuum thin-film growing technology, the optical device material (inorganic substance) can be accumulated on the stamper on an order of molecules. In consequence, there does not exist any fear that impurities such as dirts may be mixed therein, and hence a satisfactory uniformity of the material is developed, for example, a uniform refractive index is attained for the optical device, which enables a very-fine pattern to be transcribed onto the material with a high precision.

In the optical device according to the present invention, on a surface including patterns of projections and depressions associated with functional sections of an optical device, a material having a refractive index other than a refractive index of the optcical device material is applied to form a protective film thereon.

In an optical device of this constitution, for example, in a Fresnel lens, a lens layer is disposed on a glass substrate in a smimilar fashion as for the conventional device such that a protective film is formed on the lens layer. The protective film is of a material (an inorganic or organic substance), which has a refractive index different from that of the material of the lens layer. For example, the body of the Fresnel lens (the lens layer) is formed with an inorganic substance ZnS (of a refractive index 2.3), whereas the protective film is manufactured with an organic substance of an UV-setting resin (of a refractive index 1.5). Consequently, the Fresnel lens develops a function determined by the index difference between the lens and protective film. Namely, the function is equivalent to that obtained by a Fresnel lens manufactured with an optical device material having a refractive index 1.8. In addition, owing to the protective film grown on the surface of the lens layer, both surfaces of the Fresnel lens, namely, the surfaces on the glass surface side and on the lens film side (the surface of the lens) become to be flat. As a result, the lens film surface of the optical device is coated with the protective film and hence there is developed a satisfactory resistivity against various environments related to the dusts and humidity, which prevents dirts and the like from influencing upon the optical charateristics of the device. Furthermore, owing to the flat surfaces of the optical device formed with the protective film thus manufactured, an integration degree with respect to other members is increased, which expands the application fields of the optical device and which enables the size of an optical apparatus utilizing the device to be minimized.

The optical coupler according to the present invention is characterized by including a substrate in which a two-dimensional optical waveguide is formed and a cylindrical Fresnel lens disposed at least in one of light receiving and light emitting end surfaces or ends of the waveguide for focusing a collimated light in a one-dimensional direction.

In accordance with this invention, a cylindrical Fresnel lens is disposed in an end surface or end of the two-dimensional optical waveguide. Since the lens focuses the light only in a direction, by setting the direction of the focusing function to be effective in the direction of thickness of the two-dimensional optical waveguide, the incident light is coupled to the emitting light. In the direction where the focusing is not developed, the collimated light is not changed, namely, the collimated light propagates through the optical waveguide. As a result, it is unnecessitated to dispose a waveguide lens in the optical waveguide lens.

Because the waveguide lens is unnecessary, the utilization efficiency of the light becomes higher (as an example, the efficiency values of the waveguide lens and the cylindrical Fresnel lens are about 10% and 70%, respectively.) Moreover, the processes for manufacturing the device are simplified. This expectably leads to a higher yealding of the devices and to a decrease in the production cost; furthermore, the size of the device may also be decreased.

The composite optical device according to the present invention includes a transparent substrate, a grating layer disposed on an upper surface of the substrate, and a protective layer disposed on an upper surface of the grating layer, thereby forming a grating device, wherein over said grating device, one grating element or a plurality of grating elements are formed in an accumulated fashion along a vertical direction.

In the composite optical device of this structure, the primary grating device is manufactured with a grating layer formed on the upper surface of the transparent substrate. A a protective layer (e.g. an UV-setting resin) is disposed on the upper surface of the grating layer. Thereafter, one or more grating devices are accumulated on the upper surface of the protective film so as to form a composite optical device in a two-layer structure having at least a flat surface for an integration (with another optical device). Furthermore, when a protective layer having a flat upper surface is fabricated on the upper grating device in the two-layer composite device, it is further possible to accumulate on the protective layer a grating device as a third-layer of the composite device. That is, there is produced a composite optical device sturcture in three layers of grating elements. In consequence, since this device can be combined with various optical devices (e.g. a composite Fresnel lens) without any restriction imposed on the number of devices, the application fields of the device is consireably increased. Moreover, because of the flat surface (on the substrate side), the composite optcial device can be used to manufacture an integrated circuit together with other optical devices at a high integration degree.

In a case where the composite optical device (such as a composite Fresnel lens) is employed, in order to attain a numerical aperture 0.45, for example, in a two-layer device (including two lens layers) and a three-layer device (with three lens layers), the numerical apperture of each lens layer need only be 0.24 and 0.16, respectively. Consequently, the Fresnel lens of this kind has a large minimum interval or cycle and a reduced discrepancy from the phase shift function. Namely, the lens has a high numerical aperture with a decreased on-axis aberration and develops a high efficiency. In addition, since the off-axis aberration is reduced, the allowance with respect to the angular shift becomes to be broader, which facilitates the alignment of the optical axis.

In accordance with the present invention, the grating lens includes sequentially accumulated grating lens portions on the transparent substrate such that each lens portion is formed with a material having a different refractive index so as to be sequentially accumulated in an order of refractive index thereof to develop the maximum refractive index on the side of the transparent substrate and the minimum refractive index on the opposite side.

In this constitution, since each constituent lens portion is formed with a material having a different refractive index and is disposed on the transparent substrate so as to be sequentially accumulated in an order of refractive index to develop the maximum refractive index on the side of the transparent substrate and the minimum refractive index on the opposite side. Consequently, as compared with the conventional case where a lens having a high numerical aperture is produced by fixing two grating lenses on the respective rear sides of the substrates thereof, the number of constituent lenses can be increased and the numerical aperture can be improved.

Furthermore, in constrast to the conventional case where the rear sides of substrates are adhered to each other while aligning the optical axis, the alignment can be accomplished only by accumulating the constituent lens portions. The conventionally required operation to align the optical axis with a high accurracy is unnecessitated, namely, an efficient grating lens can be obtained through a simple manufacturing process.

In accordance with the grating lens manufacturing method of the present invention, a plurality of grating lens portions are accumulated by use of materials having mutually different refrative indices on the transparent substrate. The method is characterized in that the accumulation order is selected such that the refractive index develops a maximum value on the side of the transparent substrate and a minimum value on the opposite side.

According to the manufacturing method, since the grating lens can be fabricated only through a procedure in which a plurality of grating lens portions are accumulated by use of materials having mutually different refrative indices on the transparent substrate such that the accumulation order is selected so that the refractive index develops a maximum value on the side of the transparent substrate and a minimum value on the opposite side, as compared with the conventional case where two grating lenses are adhered with each other on the rear sides of the substrates thereof, it is possible to use three or more grating lenses to produce the device.

Moreover, comparing with the conventional case where the rear sides of substrates are adhered to each other while aligning the optical axis, the optical axis can be aligned only by accumulating the constituent lens portions, and hence the conventional operation required to align the optical axis with a high accurracy is unnecessituned, namely, there is provided a manufacturing method to simply produce an efficient grating lens.

In accordance with the optical circuit manufacturing method of the present invention, there is produced a stamper having in a surface thereof an optical device forming section of the projection or depression shape. An optical waveguide material is accumulated on the surface having the device forming section of the stamper such that a substrate is fixed via an adhesive agent onto the waveguide material surface. Thereafter, the material is peeled off from the stamper so as to obtain an optical circuit in which the optical device is integrally formed on the waveguide material surface.

In the optical circuit in accordance with the present invention, an optical waveguide is fixed on a substrate by use of an adhesive agent such that an optical element of the projection or depression shape is integrally formed in the optical waveguide surface.

In accordance with the present invention, consequently, there is provided an optical circuit in which an optical device is integrally disposed in the optical waveguide. With this provision, by separately disposing optical devices in the optical waveguide surface, various problems of the prior art technology can be removed. As a result, an optical circuit device having a high quality and a satisfactory performance can be easily implemented.

BRIEF DESCRIPTION OF THE DRAWINGS

These and other objects and advantages of the present invention will become apparent by reference to the following description and accompanying drawings wherein:

FIGS. 1a to 1e are process diagrams schematically showing a conventional method of manufacturing an optical device;

FIGS. 30a and 30b are diagrams showing a focusing operation of the cylindrical Fresnel lens in which FIGS. 30a and 30b are a side view and a plan view, respectively;

FIGS. 31a and 31b are diagrams showing an embodiment of an optical counpler in which FIGS. 31a and 31b show a side view and a plan view, respectively;

FIG. 32 is an explanatory diagram for explaining a Fresnel lens of a two-layer type;

FIG. 33 is an explanatory diagram for explaining a Fresnel lens of a three-layer structure;

FIG. 34 is a diagram schematically showing an LD collimator with a beam shaping function in which the Fresnel lens is utilized;

FIGS. 40a to 40d are cross-sectional view sequentially showing the manufacturing processes of the optical circuit.

DESCRIPTION OF THE PREFERRED EMBODIMENTS

Figure 2:
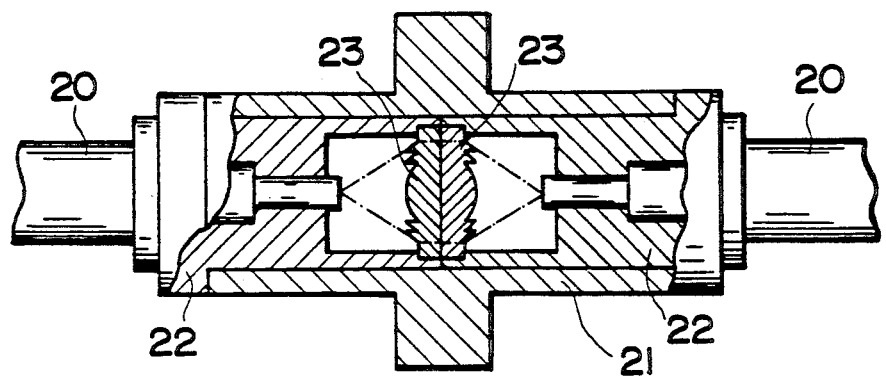
FIG. 2 is a diagram schematically showing an optical fiber coupler using the conventional optical device.

First, referring now to the drawings, a description will be given of a method of manufacturing an optical device in accordance with the present invention.

FIGS. 8a to 8h are diagrams showing concrete manufacturing processes associated with the optical device manufacturing method of the present invention.

In the process diagrams, FIGS. 8a to 8d show processes of producing a stamper to be used to manufacture an optical device, namely, a micro-Fresnel lens in this embodiment.

Figure 8A:
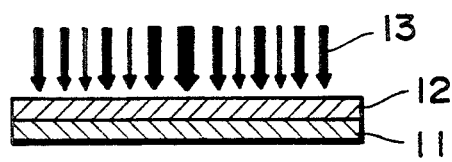
FIGS. 8a to 8h are process diagrams showing manufacturing processes achieved according to the manufacturing method of the optical device.
Figure 8B:
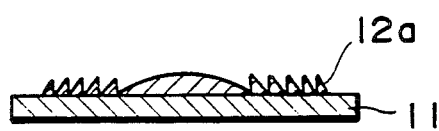

The process to fabricate the (male) stamper of the optical device is the same as the conventional process, namely, there is used an electron-beam lithography. That is, for example, an electron beam resist 12 is uniformly applied onto a surface of a silicon (Si) substrate 11; thereafter, an electron beam 13 is irradiated onto the resist 12 by means of an electron-beam writing apparatus to draw a predetermined lens partern of a male stamper (FIG. 8a). The resist 12 is developed to obtain the lens pattern 12a formed with the remaining resist layer on the substrate 11 (FIG. 8b). When the amount of the irradiated electron beam is controlled depending on locations of the electron-beam resist, the film thickness of the resist remaining after the development varies depending on the irradiated beam amount. The electron beam writing apparatus (not shown) operates under control of a computer so that the amount of the irradiated electron beam 13 can be arbitrarily changed for each coordinate position defined on the substrate 11. Furthermore, the variation pattern may also be arbitrarily established or selected depending on the software.

Figure 8C:
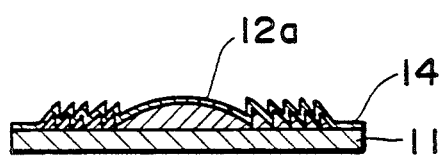
Figure 8D:
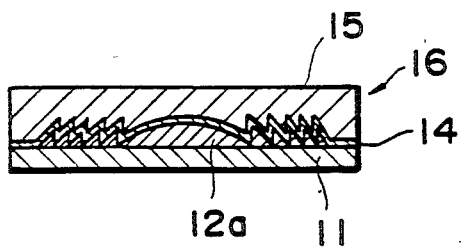
Figure 8E:
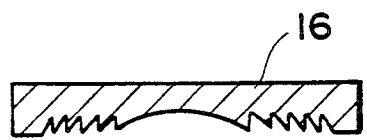

Thereafter, gold is evaporated on the substrate 11 having a remaining resist layer 12a thus formed according to the predetermined lens pattern of the male stamper, thereby forming an electrode layer 14 (FIG. 8c). Moreover, nickel is plated thereon to dispose a plate layer 15 (FIG. 8d). The remaining resist layer 12a, and if necessary, the silicon substrate 11 are dissolved by use of an organic solvent, an etching agent, and the like so as to be removed therefrom. As a result, there is obtained a male stamper (a stamper of an optical device such as a Fresnel lens) including the electrode layer 14 and the plate layer 15, namely, a stamper 16 of the optical device (Fresnel lens).

Figure 8F:
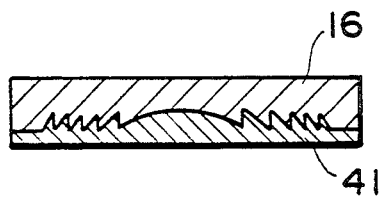
Figure 8G:
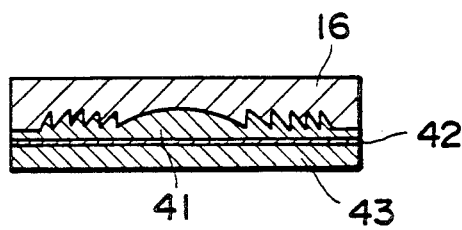
Figure 8H:
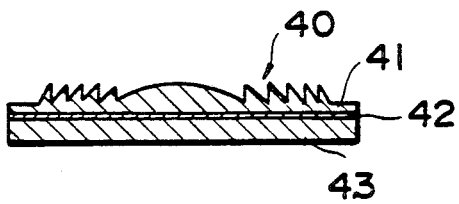
Figure 9:
FIGS. 9 to 15 are diagrams showing various optical devices manufactured by use of the optical device manufacturing method.
Figure 13:
Figure 10:
Figure 14:
Figure 11:
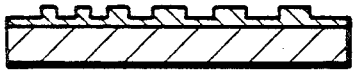

The gist of this invention resides, as shown in FIGS. 8e to 8h, in that the stamper 16 is adopted to manufacture a Fresnel lens (an optical device). Namely, by preparing a stamper 16 of the Fresnel lens (FIG. 8e), an inorganic manerial 41 which is ZnS in this embodiment is accumulated as an optical device material on the stamper 16 by use of a vacuum thin-film forming technology (FIG. 8f). In this embodiment, the vacuum evaporation method is used as the thin-film growing method. Although not shown, there is disposed a bell jar from which air is discharged to establish a high vacuum state and which is provided with a vaporization source such that stampers 16 are arranged to oppose the vaporization source. The inorganic substance (ZnS) is located on the vaporization source such that heated and molten inorganic substance is vaporized. Vaporized ZnS is directly moved onto the stamper 16 so as to fixed thereon. As for the vaporization source, for example, an electron beam method may be employed in which a electron beam is irradiated onto a crucible cooled by water so as to vaporize a desired material. By use of the vaporization source, it is possible to accumulate a film with a high purity. Moreover, during the evaporation, by rotating the arranged stamper 16 about its own axis and around an axis other than the own axis, the inorganic substance (ZnS) 41 can be uniformly adhered on the surface of the stamper 16 having fine depressions and projections, namely, complex steps. Thereafter, the stamper 16 and the optical material 41 piled thereon are removed from the bell jar so as to apply an UV-setting resin 42 onto the optical material 41 and then a glass substrate 43 is adhered thereon. The resin 42 is irradiated with an ultraviole ray so as to solidfy the resin 42, thereby integrally fixing the glass substrate 43 thereon (FIG. 8g). In the final stage, the stamper 16 is removed to obtain a Fresnel lens (FIG. 8h).

In this fashion, with the stamper 16, a large number of identical Fresnel lens 40 can be reproduced by repeating the similar processes. For the Fresnel lens manufactured by use of the inorganic material ZnS (with a refractive index 2.3) of this embodiment, it has been confirmed that the pattern of the stamper is satisfactorily transcribed and that the Fresnel lens develops an effective function. For the Fresnel lens, there exists a fear that a discrepancy may occur from the phase shift function in a portion with a small grating interval or cycle, namely, in a peripheral portion so as to lower the efficiency. However, in accordance with the method of manufacturing the Fresnel lens of this embodiment, the lens layer can be produced with a considerably small thickness. Consequently, the discrepancy from the phase shift function is minimized and there is attained a Fresnel lens of which the decrease of the efficiency in the periphery is reduced. In consequence, it is possible to manufacture an ideal Fresnel lens which develops a high efficiency, a high numerical aperture, and a reduced aberration.

By the way, in the example of this embodiment, although the vacuum evaporation method has been adopted as the vacuum thin-film forming method, the present invention is not restricted only by this method. For example, a sputtering method, a plasm chemical vapor deposition (CVD), a laser CVD molecular beam epitaxy (MBE), a liquid phase epitaxy (LPE), metalorganic (MO) CVD, and the like can be used.

Figure 16:
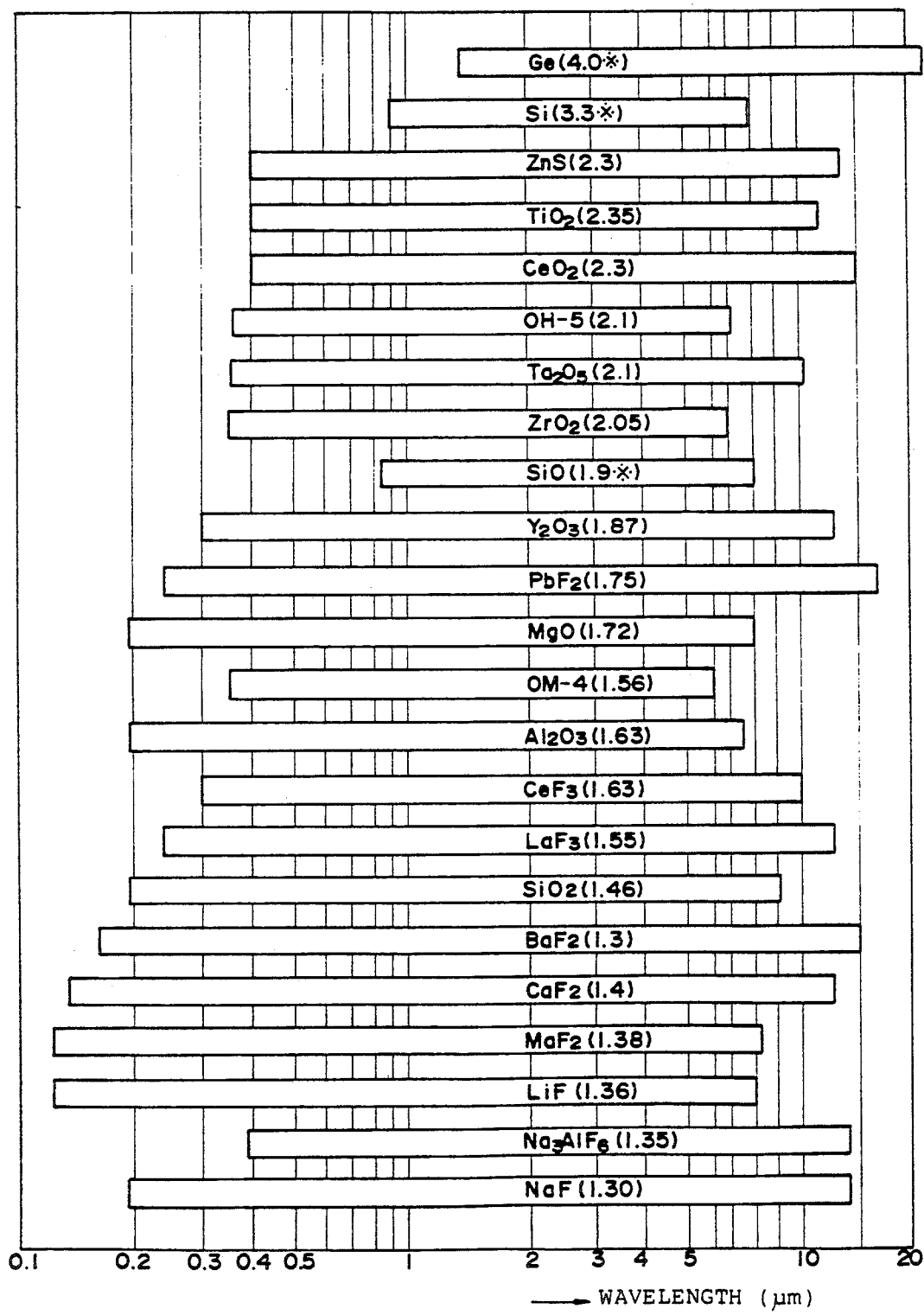
FIG. 16 is an explanatory diagram for explaining the transmission wavelength ranges of various inorganic materials (vaporization substances) used in the optical device manufacturing method.

Furthermore, as the optical device material, in addition to ZnS, any materials which can be employed to form a film by the vacuum thin-film forming technology, namely, almost all inorganic materials may be utilized. For example, as shown in the chart of transmission wavelength ranges of various substances of FIG. 16, there may be used Ge, Si, $TiO_2$, $CeO_2$, OH-5, $Ta_2O_5$, $ZrO_2$, SiO, $Y_2O_3$, $PbF_2$, MgO, OM-4, $Al_2O_3$, $CeF_3$, $LaF_3$, $SiO_2$, $BaF_2$, $CaF_2$, $MgF_2$, LiF, $Na_3AlF_6$, and NaF. Since these evaporation materials (optical device inorganic materials) respectively have quite wide ranges of transmission wavelengths as shown in FIG. 16, there is attained a large selectivity of the materials and hence an ideal optical device can be produced. Incidentally, in FIG. 16, the values in the parentheses indicate refractive indices of the respective materials in the visible region. However, the values marked with * denote refractive indices developed for a wavelength of two microns.

Figure 15:
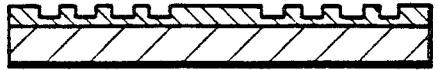
Figure 12:

FIGS. 9 to 15 are explanatory diagrams for explaining application examples of optical devices which can be manufactured according to the optical device manufacturing method. In the embodiment above, a micro-Fresnel lens is produced as an example of the optical device. The present invention is not restricted only by this embodiment. For example, it is possible to produce a grating (FIG. 9), a blazed grating (FIG. 10), a chirped grating (FIG. 11), a flat micro-lens (FIG. 12), a Fresnel lens array (FIG. 13), a micro-lens array (FIG. 14), and an optical disk (FIG. 15). Various application fields are considerable in which a Frenel lens is produced with a material having a high refractive index and in which a transparent conductive substance (ITO) is employed as the material.

Subsequently, a description will be given in detail of an embodiment of an optical device having a protective layer.

Figure 17:
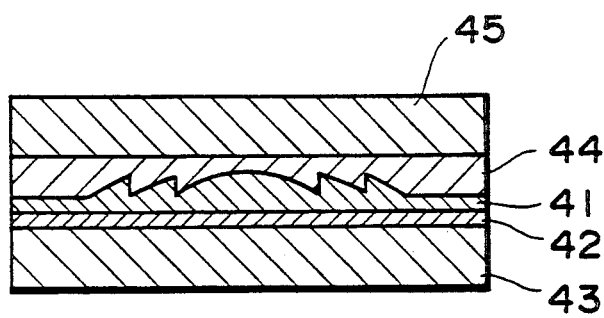
FIG. 17 is a cross-sectional view of an optical device having a protective layer.
Figure 18:
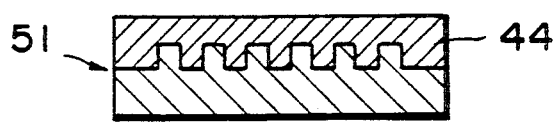
FIGS. 18 to 22 are explanatory diagrams useful to explain states in which protective films are formed on various optical devices.
Figure 19:
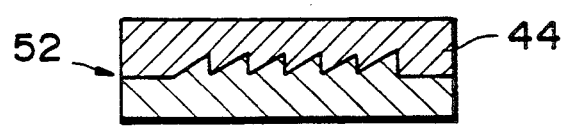
Figure 20:
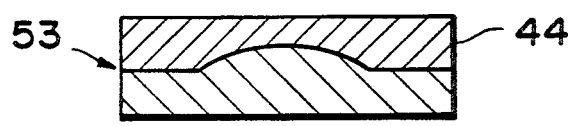
Figure 21:

FIG. 17 shows a Fresnel lens, which comprises a protective layer 44 disposed on a surface of a lens layer 41 of a Fresnel lens functional portion, the surface being associated with the depressions and projections formed on the layer 41.

The Fresnel lens functional portion is produced in the manufacturing method above and comprises a glass substrate 43, an inorganic material layer (e.g. ZnS; lens layer) 41, and an UV-setting resin layer 42 as an adhesive to secure the substrate 43 on the material layer 41.

The protective layer 44 is constituted with the UV-setting resin in this embodiment. That is, for the protective layer 44, there is employed an UV-setting resin with a refractive index 1.5 different from the refrative index 2.3 of the ZnS as the material of the lens layer 41. For the protective layer 44, the UV-setting resin is applied on the surface of the lens 41 so as to form a flat surface. Thereafter, an ultraviolet ray is irradited onto the resin, thereby obtaining a solidified resin. In consequence, the Fresnel lens is formed in a comletely flat shape, namely, both surfaces thereof are flat. The completely flat Fresnel lens develops a function determined by the refractive index difference between the lens layer 41 and the protective layer 42. In other words, the Fresnel lens has a function equivalent to the function of a Fresnel lens manufactured with an optical device material having a refractive index 1.8. By the way, in the example of this embodiment, a glass substrate 45 is further adhered onto an upper surface of the protective film 44.

Incidentally, for the production of the Fresnel lens functional portion, there may be adopted, in addition to the vacuum thin-film forming method (vacuum evaporation technology), a method like in the conventional case in which an organic material (an optical device material such as a plastic substance) is injected onto a stamper (JP-A-62-161532 and JP-A-62-161533). Moreover, in the embodiment above, an inorganic matrerial ZnS having a high refractive index is used as the optical device material (lens layer 41) and the UV-setting resin is employed as the material of the protective film 44. However, the present invention is not restricted only by this embodiment, namely, an organic material or other inorganic materials such as $TiO_2$ and $Si_3N_4$ may be adopted for the lens layer 41. In addition, and inorganic material having a low refractive index such as $SiO_2$ or other organic materials such as PMMA and polycarbonate (PC) may be used for the protective layer 44.

FIGS. 18 to 22 are explanatory diagrams for explaining alternative examples of the optical device.

Figure 22:
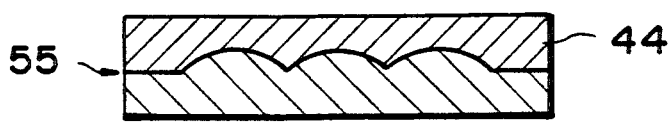

The present invention is not limited to these embodiments. Namely, the present invention is applicable, for example, to a grating 51 (to produce a protective layer 44 on a surface of a grating layer) (FIG. 18), a blazed grating 52 (FIG. 19), a micro lens 53 (FIG. 20), a Fresnel lens array 54 (FIG. 21), and a micro-lens array 55 (FIG. 22). In the configurations of FIGS. 18 to 22, the protective layers are denoted by a reference numeral 44, whereas the optical device functional portions are not particularly assigned with any reference numeral. Moreover, only one layer is shown for simplicity.

Figure 23:
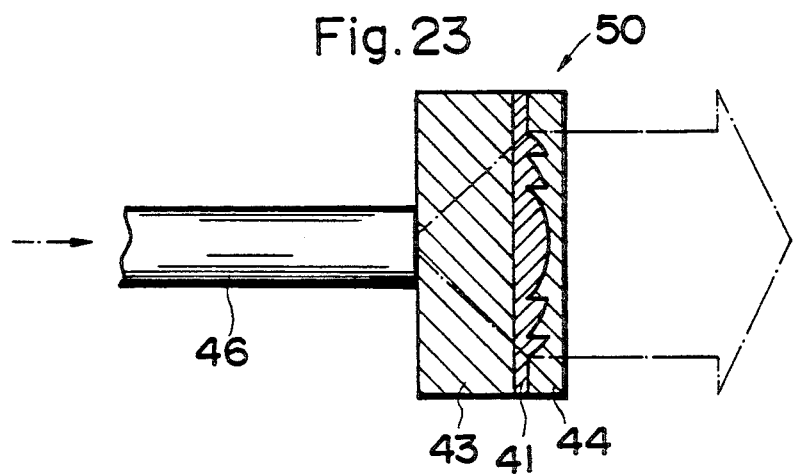
FIG. 23 is a schematic diagram showing a fiber collimator utilizing the optical device.

FIG. 23 shows an application example of an optical fiber collimator employing a Fresnel lens. In this structure, a Fresnel lens 50 of FIG. 17 is combined with an optical fiber 46 so as to collimate a light emitted from the optical fiber 46 by use of the Fresnel lens 50. In this example of an integrated circuit, a flat surface of the glass substrate 43 is brought into contact with an end surface of the optical fiber 46. In the Fresnel lens 50, a UV-setting resin layer 42 and a glass substrate 45 are not shown.

Figure 24A:
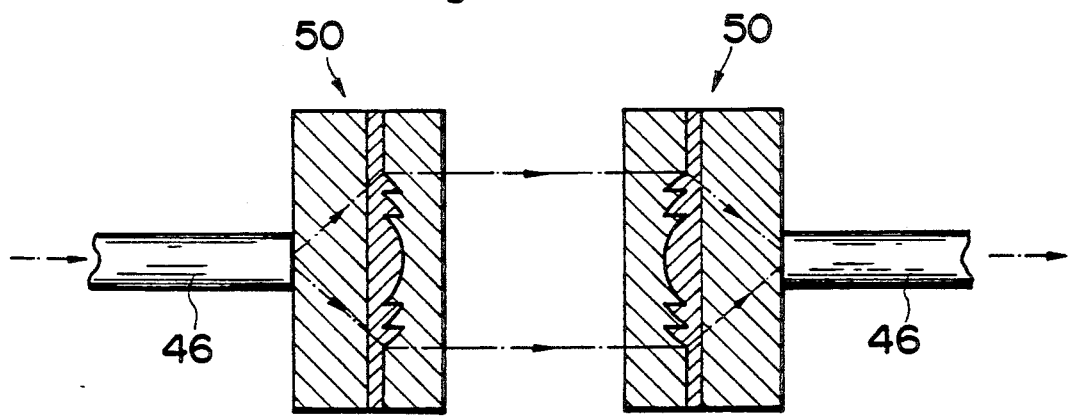
FIGS. 24a and 24b are explanatory diagrams useful to explain a fiber coupler employing the optical device.
Figure 24B:
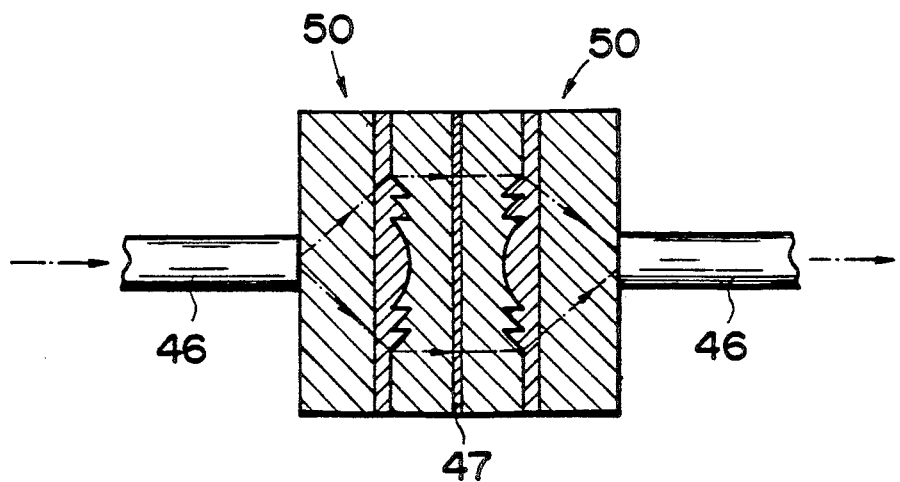

FIGS. 24a and 24b show an otical fiber coupler utilizing a Fresnel lens 50. FIG. 24a shows an example in which a pair of optical fiber collimators of FIG. 23 are arranged to oppose each other via a preset space. In the construction of FIG. 24b, two optical fiber collimeters are fixed with each other, namely, protective layers 44 thereof are adhered to each other by use of an optical adhesive agent 47. In this configuration, a pair of optical fiber collimetors can be integrally formed. Consequently, as compared with the conventional example of FIG. 2, there is developed a satisfactory resistivity against various environments associated with the resistivity against dusts and the humidity absorbing property. Moreover, owing to the integrated constitution, the retaining structure is quite stable and the size of the optical fiber coupler and the like can be reduced.

Figure 25:
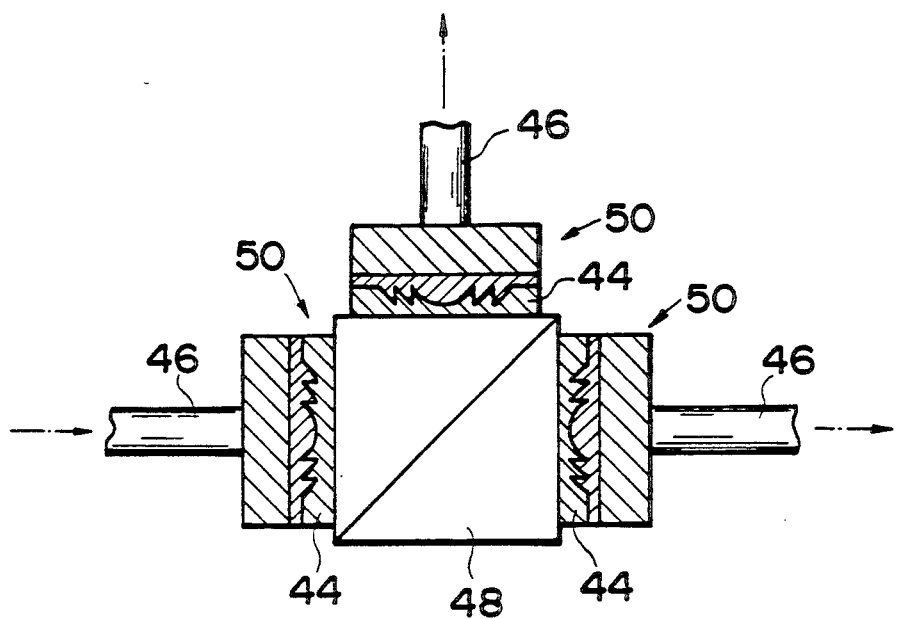
FIG. 25 is a diagram schematically showing a light distributor using the optical device.

FIG. 25 shows a light distributor of an optical fiber type using the Fresnel lens 50. This system includes an integrated structure of optical fiber collimators and a beam splitter 48. Namely, three optical fiber collimeters are integrally formed such that the protective layer 44 is brought into contact with the beam splitter 48 through a surface-to-surface contact. This provision leads to a function to couple a light emitted from an optical fiber 46 to other plural optical fibers 46. By the way, by replacing the beam splitter 48 with a polarized beam splitter, there can be configured a polarized beam splitter of an optical fiber type, which enables lights to be separated depending on the directions of polarization. Furthermore, various application examples are considerable, for example, by adding a function to rotate the polarization on the light receiving side, an optical switching device can be implemented.

Figure 26:
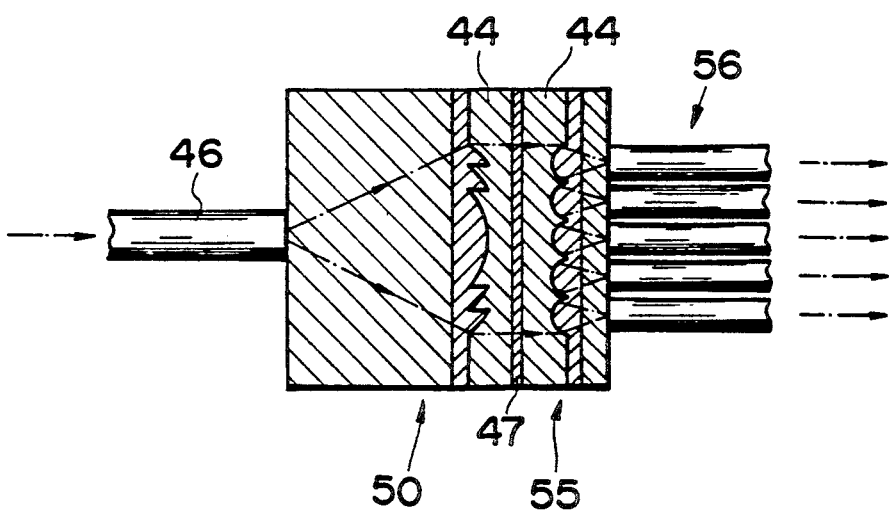
FIG. 26 is an explanatory diagram for explaining an optical distributor adopting the optical device.

FIG. 26 shows a light distributor of an optical fiber type using the micro-lens array 55 (FIG. 22). The distributor includes an optical fiber collimator, a micro-lens array 55, and an optical fiber array 56 comprising optical fibers linked to the respective micro lenses of the lens array 55. Namely, the circuit system is formed in an integated circuit such that a surface of a protective layer 44 of the mirco-lens array 55 linked with the optical fiber array 56 is brought into contact with a surface of a protective layer 44 of a Fresnel lens 50 of the fiber collimator so as to be connected to a grounding potential. In this situation, a high integration degree is developed to reduce the size of the device; moreover, the number of light distributions is increased.

Figure 27:
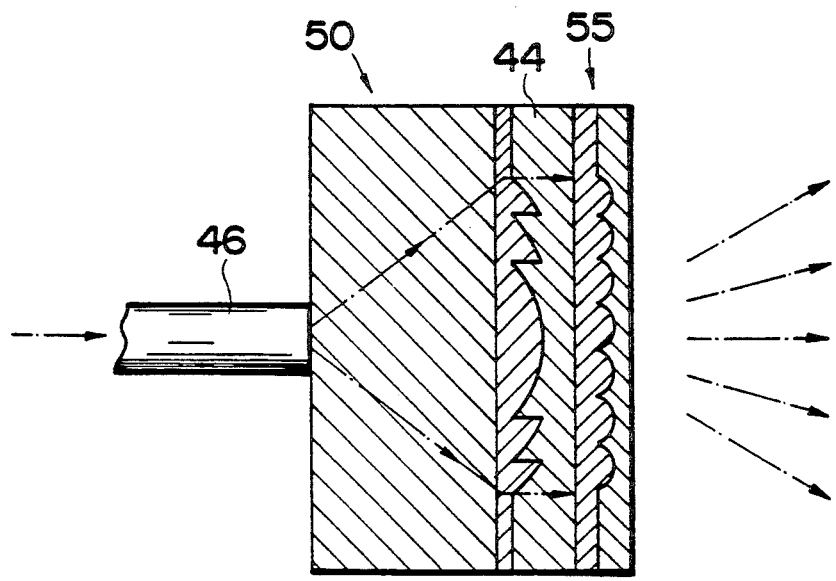
FIG. 27 is a diagram schematically showing a fiber multibeamer employing the optical device.

FIG. 27 shows an optical fiber multibeamer employing the Fresnel lens 50. In this configuration, a micro-lens array 55 is additionally disposed for an optical fiber collimator using the Fresnel lens 50, which improves the accessibility to an object. On a surface of a protective film 44 of the Fresnel lens 50, a micro-lens array 55 is integrally disposed.

Figure 28:
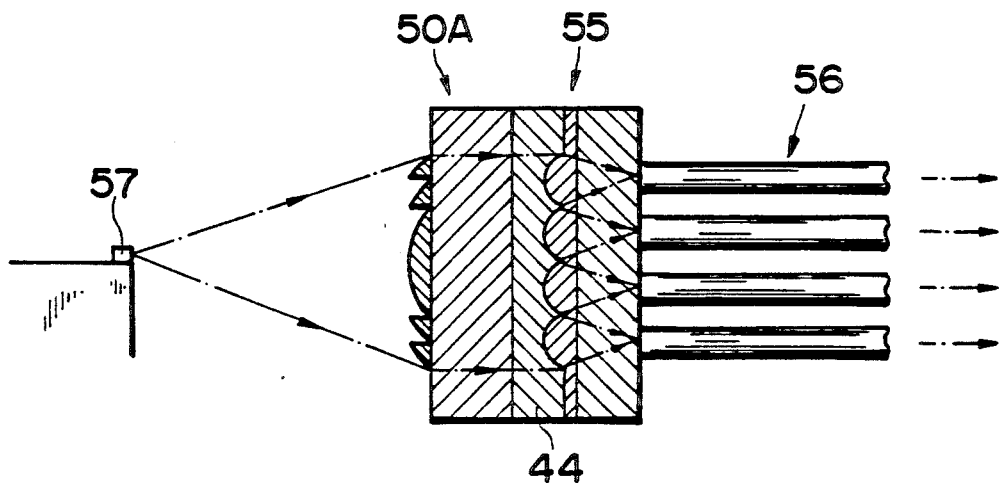
FIG. 28 is an explanatory diagram useful to explain an LD-fiber array coupling using the optical device.

FIG. 28 shows a coupler between an laser diode (LD) and an optical fiber array utilizing the micro-lens array 55. On a substrate side of a Fresnel lens 50A (a Fresnel lens not provided with a protective layer 44) opposing the laser diode 57, a surface of a protective layer 44 of the micro-lens array is formed so as to be brought into contact therewith such that an optical fiber array 56 is linked to a substrate side of the micro-lens array 55, thereby obtaining an integrated circuit. A light emitted from the laser diode 57 is collimated by the Fresnel lens 50A so as to focus the light through the micro-lens array 55 onto the optical fibre array 56. That is, three functions including the collimation of the emitted light, the distribution of light, and the focusing thereof are integrated in this system.

Next, an embodiment of an optical coupler will be described in detail.

Prior to a description of the embodiment of an optical coupler according to the present invention, a cylindrical Fresnel lens will be described.

Figure 29:
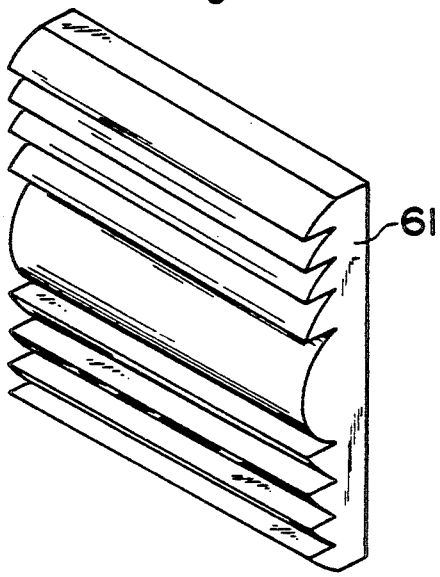
FIG. 29 is a perspective view of a cylindrical Fresnel lens.
Figure 30A:
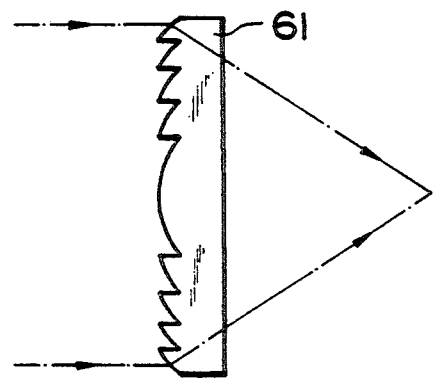
Figure 30B:
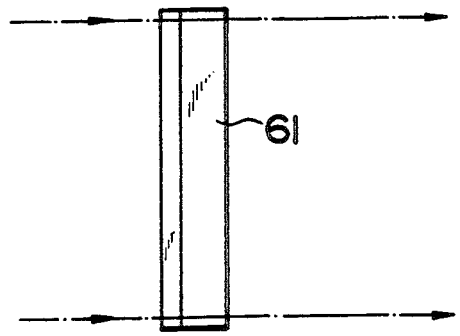
Figure 35:
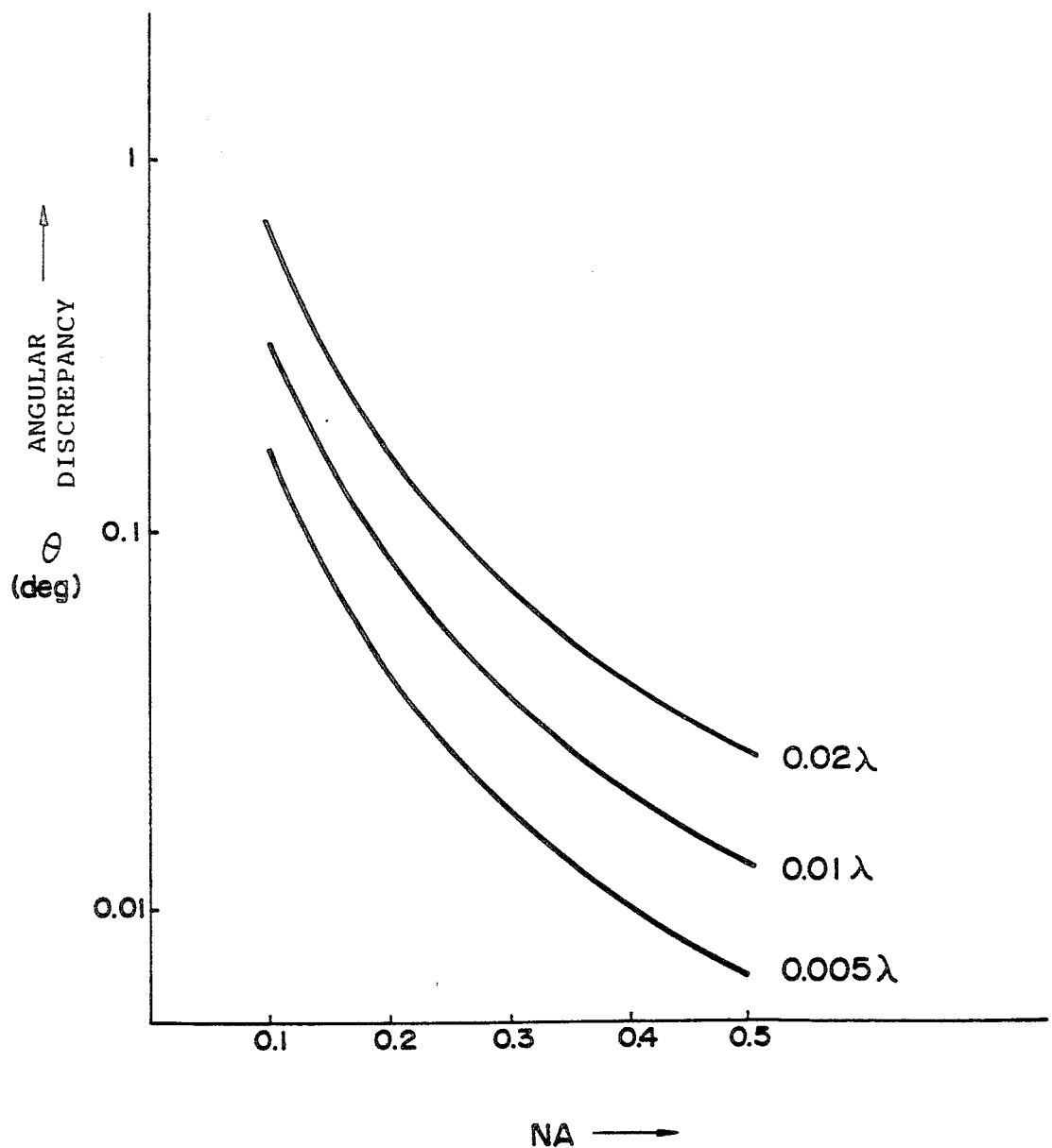
FIG. 35 is a graph showing relationships between the numerical aperture of the Fresnel lens and the angular shift.

FIG. 29 shows an appearance of a cylindrical Fresnel lens 61 comprising a large number of Fresnel zones (patterns of depressions and projections), which are mutually parallel to each other on a surface (only a few zones are shown here for simplicity of the drawing). These zones are arranged such that an interval or a cycle of each zone is reduced as the distance between the zone and the center of the zones is increased. When a light enters the cylindrical Fresnel lens 61, as can be seen from a side view of FIG. 30a, the light focusing function is achieved only in a one-dimensional direction in which the Fresnel zones are cyclically formed; whereas, as shown in a plan view of FIG. 30b, the focusing of the light is not conducted in a direction vertical to the one-dimensional direction. Consequently, in the vertical direction, the incident light thus collimated is directly emitted as a collimated light.

A cylindrical Fresnel lens can be manufactured by use of an electron beam lighography, a photo-polymerization, and the like. Furthermore, the optical device fabricating method described aboved may also be employed for the production of the cylindrical Fresnel lens. The lens may be provided with a protective layer on a surface thereof.

FIGS. 31a and 31b show an embodiment of an optical coupler in accordance with the present invention in which FIGS. 31a and 31b are a side view and a plan view of the coupler, respectively.

On both end surfaces of a two-dimensional optical waveguide 25 formed on a substrate 24, cylindrical fresnel lenses 61 and 71 are arranged such that the focusing direction thereof matches with the direction of thickness of the optical waveguide 25. Both surfaces of the cylindrical Fresnel lenses 61 and 71 are coated with covers 64 and 74 (substrates, protective layers, etc.) so as to be protected against dusts and the like, namely, against an influence from the external environments.

The emission surface of the light emission optical fiber 62 and the light receiving surface of the receiving optical fiber 72 are optically linked via rod lenses 63 and 73 with the cylindrical Fresnel lenses 61 and 71, respectively. The rod lens 63 is used to collimate dispersed lights, whereas the rod lens 73 is disposed to focus the collimated lights. These rod lenses 63 and 73 may be fixed on the end surfaces of the optical fibers 62 and 72 by use of an adhesive agent or the like or may be mutually fixedly secured by use of appropriate retainers together with the cylindrical Fresnel lenses 61 and 71, the substrate 24, and the like. Moreover, the cylindrical Fresnel lenses 61 and 71 may be adhered onto end end surfaces of the substrate 24.

A light propagating through the optical fiber 62 is emitted as dispersed lights from the end surface of the optical fiber 62. The dispersed light are collimated by the rod lens 63 into a collimated light having a circular cross section. The collimated light is focused only in the one-dimensional direction (vertical direction) through the cylindrical Fresnel lens 61 so as to be fed to the two-dimensional optical waveguide 25 on the substrate 24. Since the incident light is not focused in the surface direction of the two-dimensional optical waveguide 25 through the cylindrical Fresnel lens 61, the light collimated by the rod lens 63 directly propagates through the optical waveguide 25 to enter an optical processing section 60. In the optical processing section 60, the light (propagated) through the optical waveguide 25 is subjected to processing such as an amplitude modulation and a phase modulation depending on a signal (an electric or optical signal, or the like) supplied from an external device. The propagation light (collimated light) undergone the predetermined processing in the optical processing section 60 is emitted from another end surface of the optical waveguide 25 and then enters the cylindrical Fresnel lens 71. The light emitted from the optical waveguide 25 disperses in the direction of the thickness of the waveguide 25 such that the dispersed lights are collimated only in this thickness direction by the cylindrical Fresnel lens 71. In the surface direction of the optical waveguide 25, the emitted light thus collimated passes directly through the cylindrical Fresnel lens 71. After the lens 71, the light enters the rod lens 73 so as to be focused therethrough. The focused light enters the optical fiber 72 from the end surface thereof.

As described above, since the cylindrical Fresnel lenses 61 and 71 are disposed in the vicinity of the end surfaces of the optical waveguide 25 or is disposed to be brought into contact therewith, it is unnecessary to form a waveguide lens as a collimator lens in the optical waveguide. Consequently, the light can be efficiently utilized and the yielding of the devices is expectably increased.

A description will be next given of an embodiment of a composite optical device. This embodiment is configured in association with a composite Fresnel lens having a large numerical aperture.

FIG. 32 shows an example of a composite Fresnel lens structured with two accumulated lens layers. In this composite Fresnel lens of the two-layer constitution 80, there is disposed, on a Fresnel lens 50 having a protective layer 44, another Fresnel lens layer 75 over the protective film 44. The Fresnel lens 50 is manufactured according to the method above in which ZnS is formed on a stamper by the vacuum evaporation. An UV-setting resin is adopted to fabricate the protective film 44. However, in the drawing, the UV-setting resin between the ZnS lens layer 41 and the substrate 43 is not shown. The Fresnel lens layer 75 is produced by adhering a Fresnel lens desirably produced in the similar fashion onto the Fresnel lens 50. The substrate of the Fresnel lens layer 75 is not shown in the drawing. The Fresnel lens layer 75 may also be provided with a protective layer thereon.

FIG. 33 shows a Fresnel lens 81 including three piled lens layers.

In the Fresnel lens 81, on the second lens layer 75 of the two-layer Fresnel lens 80 of FIG. 32, there is further disposed a protective layer 76, and a lens layer 77 is formed on the protective layer 76.

In either one of the two-layer Fresnel lens 80 of FIG. 32 and the three-layer Fresnel lens 81 of FIG. 33, a flat surface is provided on the side of a glass substrate 43 (the rear surface of the substrate 43), namely, this device can be used to produce an integrated circuit together with other optical devices.

For the composite Fresnel lens, in order to develop a numerical aperture 0.45, it is only necessary to set the numerical aperture to 0.24 and 0.16 for each lens layer of the two-layer Fresnel lens of FIG. 32 and for each lens layer of the three-layer Fresnel lens of FIG. 33, respectively. For each lens layer, the minimum cycle or interval can be increased and the discrepancy from the phase shift function can be reduced. In consequence, each of the Fresnel lenses develops a high efficiency and a large numerical aperture, and the on-axis aberration is minimized. Furthermore, since the off-axis aberration is also reduced and the allowance of the angular deviation is increased, the optical axis can be easily aligned.

Moreover, since the ordinary aspherical lens and the like are attended with a curvature, the numerical aperture is limited to at most about 0.5 to 0.6. However, owing to the flatness of the Fresnel lens, the value of numerical aperture is not limited and hence the numerical aperture can be increased to the desired extent by accumulating the lens layers. For example, with four accumulated Frenel lens layers each having a numerical aperture 0.24, there is attained a lens of NA=about 0.7. When this lens is adopted as an objective of an optical pickup, the spot diameter is reduced to half the conventional size (NA=0.45), which enables the recording density of the optical disk to be increased to four times the density of the conventional system.

FIG. 34 is an explanatory diagram for explaining a laser diode collimator having a beam shaping function in which the composite Fresnel lens is used.

Figure 6:
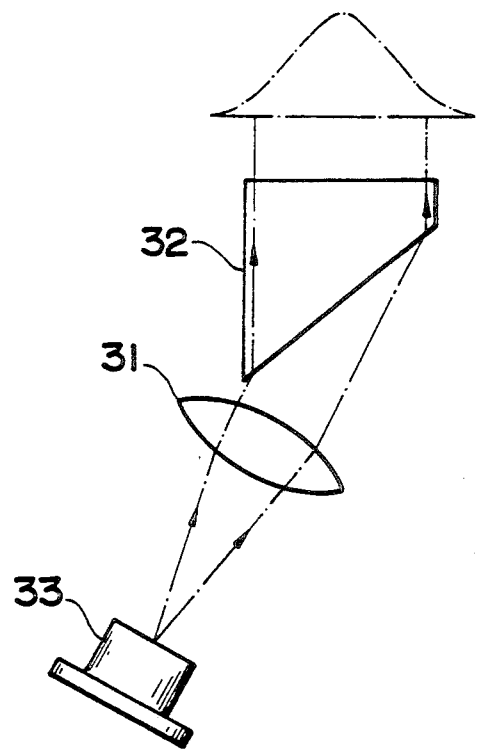
FIG. 6 is an explanatory diagram useful to explain a conventional laser diode (LD) collimator having a beam shaping function.
Figure 3:
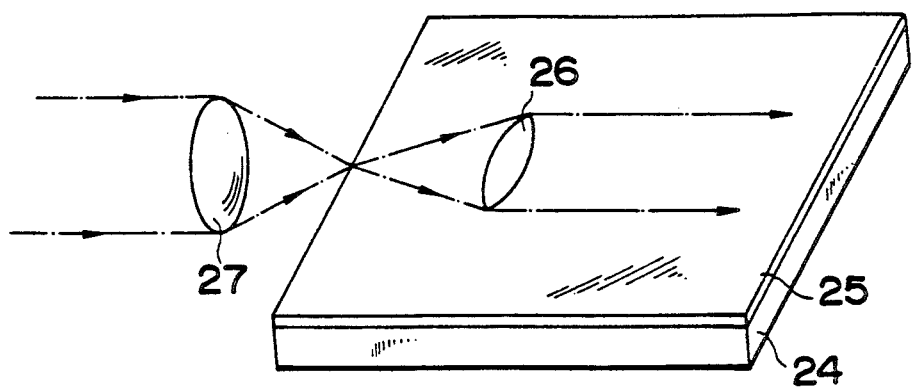
FIGS. 3 to 5 are perspective views showing an optical coupling method in a conventional optical waveguide.
Figure 4:
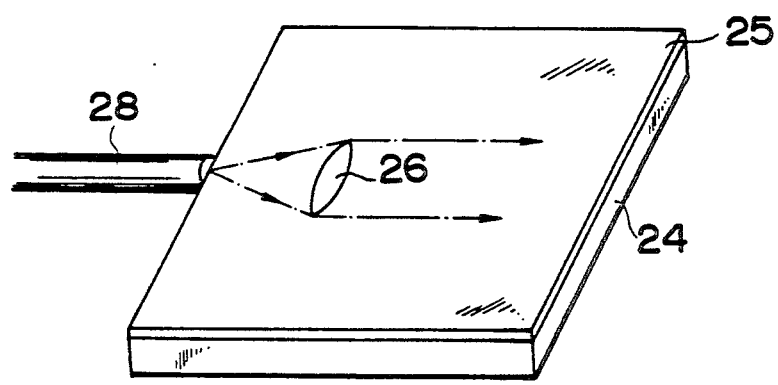
Figure 5:
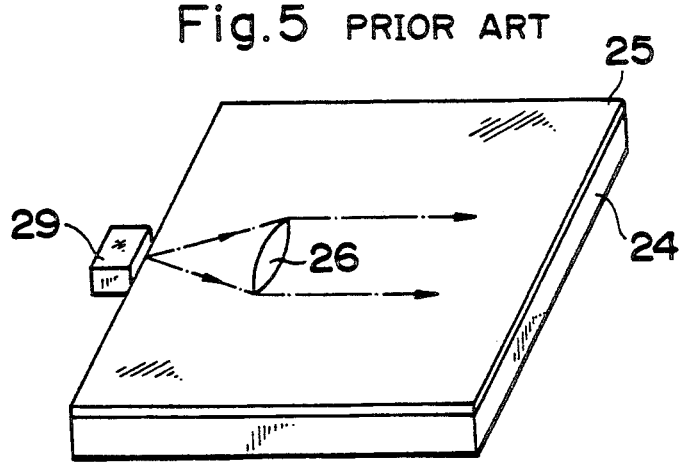
Figure 7:
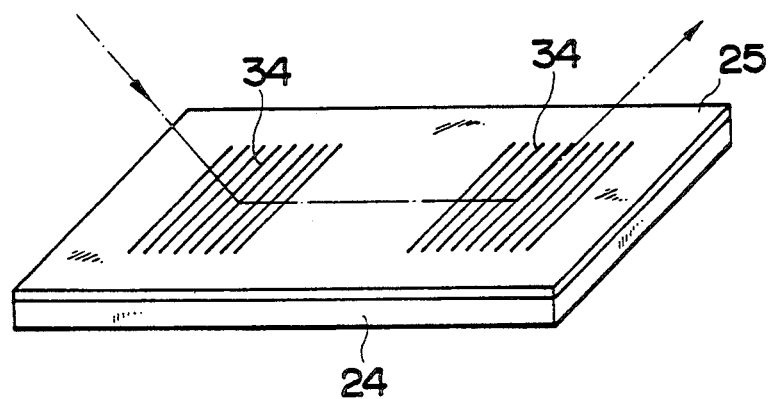
FIG. 7 is a perspective view showing a conventional optical circuit.

In the configuration of this application example, the two-layer Fresnel lens 80 having a high numerical aperture of FIG. 32 is arranged to oppose a laser diode (LD) chip 57, and a grating 78 for shaping a beam is adhered onto a surface of the Fresnel lens 80 on the side of the substrate 43 (flat surface), thereby implementing an integrated system. The lights dispersed from the laser diode chip 57 are collimated by the Fresnel lens 80 having a high numerical aperture such that the resultant beam is shaped in a circular contour through a beam shaping grating 78 so as to be emitted as a shaped beam. According to the laser diode collimator having the beam shaping function of this example, the weight and cost of the circuit are lowered and a high stability is developed as compared with the conventional example (FIG. 6). Particularly, due to the reduction of the weight, the access time can be minimized.

Next, a description will be given of an embodiment of a grating lens and a method of manufacturing the lens. In this embodiment, the description will be given of a configuration in which the grating lens is applied to a micro-Fresnel lens. However, the present invention is naturally applicable not only to the micro-Fresnel lens but also to other grating lenses in the similar manner.

Figure 36A:
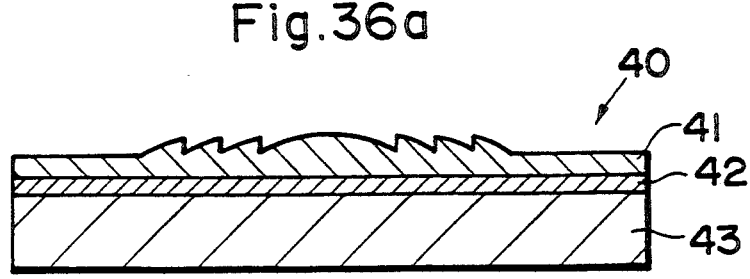
FIGS. 36a to 36c are explanatory diagrams useful to explain a method of manufacturing a grating lens.
Figure 36B:
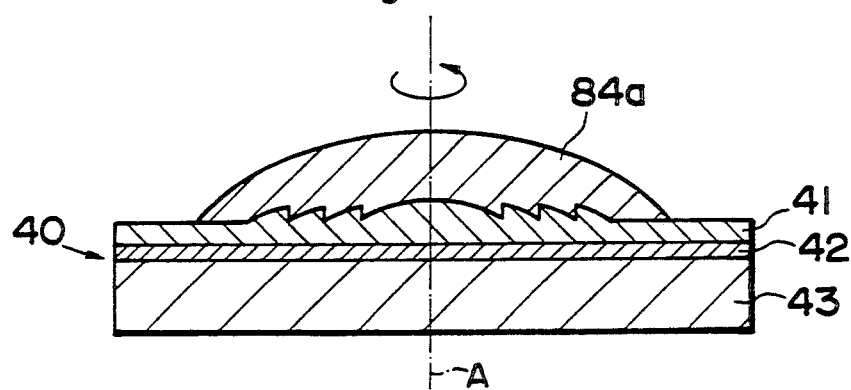
Figure 36C:
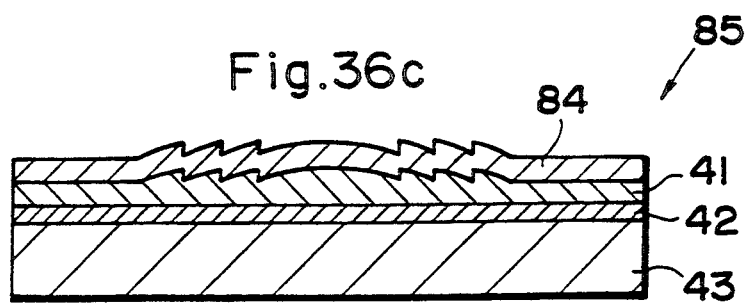

FIGS. 36a to 36c are explanatory diagrams for explaining a method of manufacturing a micro Fresnel lens. FIG. 36c is a cross-sectional view of a primary portion of the micro Fresnel lens thus produced.

The micro-Fresnel lens 40 of FIG. 36a is identical to the lens of FIG. 8h, namely, the lens 40 is manufactured through the fabrication processes of FIGS. 8a to 8h. That is, an inorganic material (e.g. ZnS) is accumulated as the material of a micro-Fresnel lens on the stamper by use of the vacuum evaporation method. The inorganic material is thereafter removed from the stamper to attain a micro-Fresnel lens. The configuration includes a lens layer 41 of the piled inorganic material, a transparent substrate 43, and an adhesive agent (UV-setting resin) 42.

As shown in FIG. 36b, an UV-setting resin 84a is applied onto a first micro-Fresnel lens portion 41 on the substrate 43. The portion 41 is rotated about a center axis A of the rotation to form the resin 84a into a thin-film shape along the surface contour of the first micro-Fresnel lens portion 41. An ultraviolet ray is irradiated onto the resin 84a to solidify the resin 84a, which therefore forms a second micro-Fresnel lens portion 84.

It is assumed here that the inorganic material of the first micro-Fresnel lens portion 41 is selected such that the refractive index n1 of the first micro-Fresnel lens portion 41 is greater than the refractive index n2 of the second micro-Fresnel lens portion 84. Since the UV-setting resin has a refractive index of about 1.52, the inorganic material having a refractive index of about two, for example, ZnS, ZrO$_2$, or the like can be employed.

As described above, in the micro-Fresnel lens 85 of FIG. 36c, on a transparent substrate 43 of a glass, there is adhered the first micro-Fresnel lens portion 41 by use of an adhesive agent 42 including an UV-setting resin. The second micro-Fresnel lens portion 84 is accumulated on the micro-Fresnel lens portion 41.

The respective micro-Fresnel lens portions 41 and 84 are sequentially piled and are formed with materials having mutually different refractive indices. Namely, these lens layers 41 and 84 are accumulated in an order of refractive indices so that the maximum refractive index is obtained on the side of the transparent substrate 43 and the minimum refrative index is developed on the opposite side. In this situation, assuming that the thickness of the grating to be t, the refractive index discrepancy between the lens portions 41 and 84 to be $\Delta n$ ($= n1 - n2$), and the wavelength of the light to be $\lambda$; the highest diffraction efficiency is attained when $t = \lambda/\Delta n$ holds.

Figure 37A:
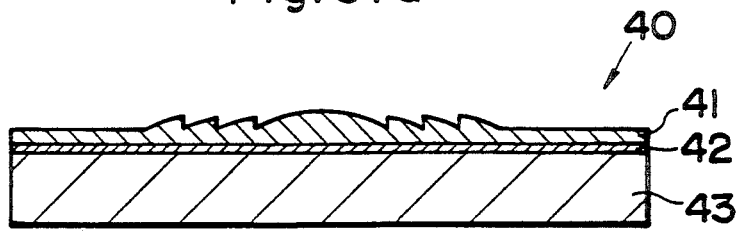
FIGS. 37a to 37c are explanatory diagrams useful to explain a method of manufacturing another grating lens.
Figure 37B:
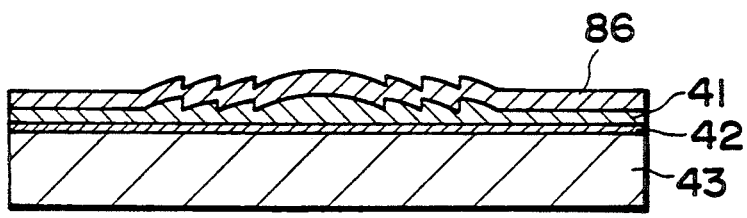
Figure 37C:
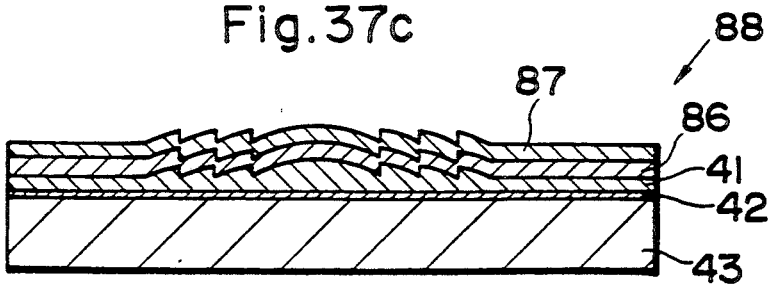

FIGS. 37a to 37c are explanatory diagrams for explaining an alternative method of manufacturing another micro-Fresnel lens. FIG. 37c shows a cross-sectional view of a main portion of the micro-Fresnel lens produced by use of the method.

On the micro-Fresnel lens 40 (FIG. 37a), inorganic substances respectively having refractive indices n2 and n3 are sequentially deposited through vacuum evaporation processes (FIGS. 37b and 37c). As a result, a second micro-Fresnel lens 86 of the inorganic material with a refractive index n2 is formed on the first lens portion 41 having a refractive index n1, and a third micro-Fresnel lens 87 of the inorganic material with a refractive index n3 is manufacture on the second lens portion 86, thereby fabricating a three-layer micro-Fresnel lens 88.

In these processes, the first lens portions 41 and 86 may be produced with inorganic materials such as ZrO$_2$ and ZnS, and Al$_2$O$_3$ and SiO$_2$, respectively; whereas the third lens portion 87 may be formed with inorganic materials such as MgF$_2$ and NaF.

By the way, in the embodiment above, in a case where a multilayer micro-Fresnel lens portion (x layers) is to be produced, the best diffraction efficiency is developed when the refractive index discrepancy between the adjacent micro-Fresnel lenses is selected to be a fixed value $\Delta n$, namely, $n1 - n2 = n2 - n3 = \ldots = nx - 1$ (refractive index of air) $= \Delta n$; where, n1, n2, ..., and nx represent refractive indices of first to x-th micro-fresnel lenses, respectively. For example, in the composite lens of FIG. 36c, when the refractive indices of the first micro-Fresnel lens 41 and the second micro-Fresnel lenses 84 are set to 2.0 and 1.5, respectively, there is developed the best diffraction efficiency.

In addition, manufacturing methods other than the embodiment above may be applicable. For example, there may be employed a method in which lens materials are accumulated in several layers on a stamper so as to thereafter directly remove the material from the stamper, thereby obtaining a multilayer micro-Fresnel lens portion.

Figure 38:
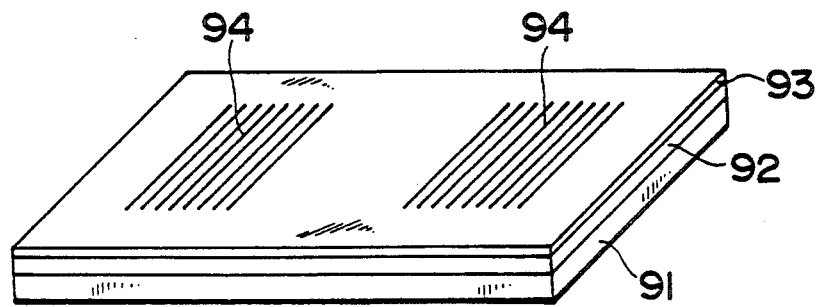
FIG. 38 is a perspective view showing an alternative embodiment of the optical circuit.
Figure 39:
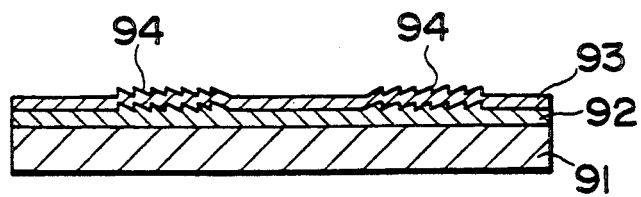
FIG. 39 is a cross-sectional view of the optical circuit.

A description will now be given of an optical circuit and a method of producing the circuit. FIGS. 38 and 39 are a perspective view and a cross-sectional view of the optical circuit.

This configuration includes a substrate 91 on which an optical waveguide 93 is disposed via an optical adhesive agent 92. The optical waveguide 93 is integrally provided with a pair of grating couplers 94 as optical circuit devices. Materials and other items of this system will be later described in conjunction with the explanation of the manufacturing method.

FIGS. 40a to 40d are explanatory diagrams for sequentially explaining processes of the manufacturing method of this embodiment.

First of all, a mother board or an original board 95 is produced as shown in FIG. 40a. In the original board 95, stripes of projections 97 having the same contour as those of the grating of the grating coupler 94 are disposed on a substrate 96. The projected stripes 97 are fabricated by removing desired portions of a resist layer 98, for example, by use of an electron-beam lithography.

Subsequently, by using the side of the stripes 97 of the original board 95, there is manufactured a stamper 100 of a metal through a plating process as shown in FIG. 40b, the stamper having on a surface thereof stripes of depressions 99 as a mold portion.

On the surface of the depressed stripes 99 of the stamper 100, as shown in FIG. 40c, an optical waveguide material 93a is then piled, for example, through the vacuum evaporation process. In this process, a portion of the waveguide material 93a enters the depressions of stripes 99. The materials 93a may be Al$_2$O$_3$ (refractive index 1.63), LaF$_3$ (refractive index 1.55), and SiO$_3$ (refractive index 1.53 to 1.55).

Next, as shown in FIG. 40d an optical adhesive agent 92 such as an UV-setting adhesive is applied onto the waveguide material 93a. Thereafter an ultraviolet ray is irradated onto the adhesive agent 92 from the substrate side 91 so as to solidify the adhesive agent 92.

For the optical adhesive 92 having a refractive index 1.52, the waveguide material 93a is desired to possess a refractive index slightly greater than that of the adhesive 92. Consequently, materials such as Al$_2$O$_3$, LaF$_3$, and SiO$_3$ having such refractive indices can be employed for the waveguide material 93a.

Furthermore, for the substrate 91, a transparent material, for example, a glass is used because it is necessary to pass therethorugh the ultraviolet ray when solidifying the UV-setting adhesive resin 92.

After the resin 92 is solidified, the optical waveguide mateial 93a is removed from the stamper 100 so as to obtain an optical circuit in which the grating couplers 94 are integrally formed on the waveguide 93.

In the embodiment above, when the waveguide material has an insufficient or excessive refractive index, it is only necessary to dispose a buffer layer between the waveguide material and the optical adhesive resin. For example, for a waveguide material having a refractive index 2.35, the buffer layer is formed with a material of a refractive index about 2.30. Combinations of the waveguide material and buffer layer are as follows, for example.

| Waveguide material | Buffer layer |
| --- | --- |
| Corning 7059 glass (Product name of Corning Inc.) | $SiO_2$ |
| $TiO_2$ | ZnS |
| TiO | $TiO_2$ |

Figure 41:
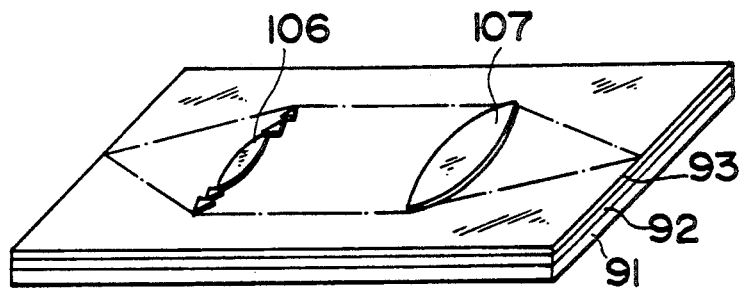
FIGS. 41, 42, 43, and 44 are perspective view respectively showing alternative embodiments of the optical circuits.
Figure 42:
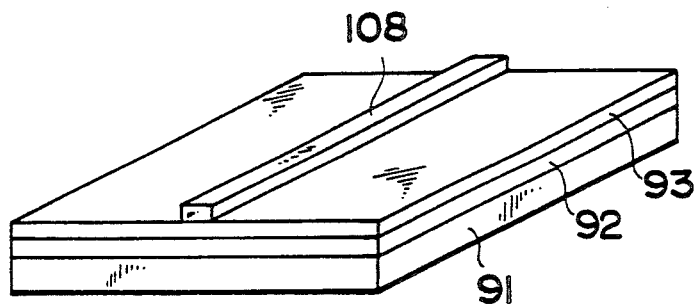
Figure 43:
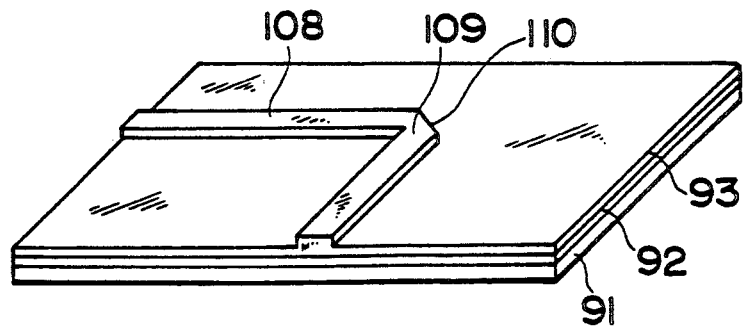

FIGS. 41 to 43 show alternative embodiments of the optical circuit produced according to the manufacturing method above.

The circuit of FIG. 41 includes as optical circuit elements or devices an optical waveguide lens 106 of the Fresnel type and a waveguide lens 107 of a spherical type. The configuration of FIG. 42 includes a waveguide ridge portion 108, namely, this embodiment includes a so-called ridge-type waveguide. In the circuit of FIG. 43, the waveguide ridge portion 108 of FIG. 42 is bent in a deflected shape such that a mirror section 110 changing the waveguide direction is disposed in the deflected portion 109.

Figure 44:
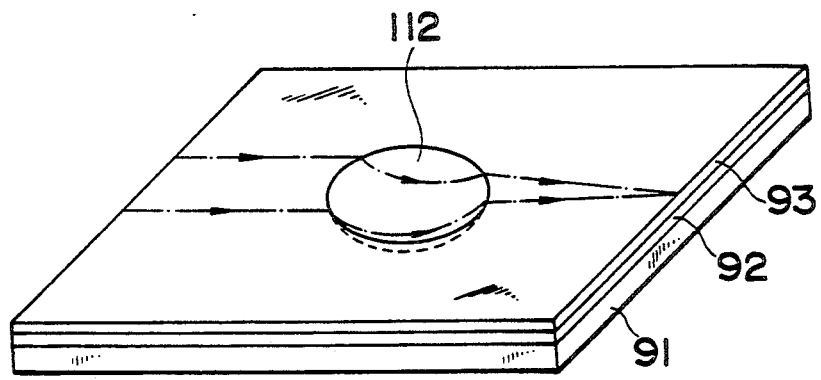

In the embodiments above, the effective index is changed in an optical waveguide disposed in the lower position of the optical circuit device; however, as shown in FIG. 44, the optical device may be constructed such that the refractive index is discontinuously changed. That is, in the constitution of the embodiment of FIG. 44, due to a depressed portion 112 of a spherical contour, there exists air in the depression 112. Consequently, because the refractive index of the air is smaller than that of the waveguide, the light is led to propagate along a surface of the waveguide 63. This embodiment is structured such that the focusing of the light is accomplished according to the Fermat's principle (geodesic lens).

In addition, all of the optical circuit devices are of a passive type. However, it is also possible to futher disposed, after the devices are produced, dispose a buffer layer on the waveguide surface through a sputtering process or the like to form electrodes of Au, Al, or the like at predetermined positions on the buffer layer so as to fabricate active optical circuit devices such as a phase modulator and an optical intensity modulator, thereby manufacturing an integrated optical circuit including various optical circuit devices.

While the particular embodiment of the invention has been shown and described, it will be obvious to those skilled in the art that various changes and modifications may be made without departing from the present invention in its broader aspects.

We claim:

1. An optical device manufacturing method comprising the steps of:

accumulating an inorganic material having optical transmissivity on a stamper having an optical device forming section by growing a vacuum thin-film;

fixing a substrate on a surface of the accumulated optical device inorganic material by use of an adhesive agent interposed between said accumulated optical device and said substrate;

solidifying the adhesive agent to integrate the accumulated optical device inorganic material on the substrate; and separating the substrate and the accumulated optical device inorganic material integrated with each other from the stamper to obtain an optical device comprising the substrate and the accumulated optical device inorganic material.

2. A method in accordance with claim 1, further comprising the steps of:

using an ultraviolet setting resin as said adhesive agent; and irradiating with an ultraviolet ray onto said ultraviolet setting resin through said transparent substrate to solidify the ultraviolet setting resin.

3. A method in accordance with claim 1, further comprising the step of:

forming a protective layer on another surface of the acccumulated optical device inorganic material with a material having a refractive index different from a refractive index of the accumulated optical device inorganic material.

4. A method in accordance with claim 3, further comprising the step of:

using an ultraviolet setting resin as the material forming the protective layer.

5. A method in accordance with claim 1, further comprising the steps of:

applying an ultraviolet setting resin on another surface of the accumulated optical device inorganic material so as to form a flat surface; and irradiating said ultraviolet setting resin with an ultraviolet ray to solidify the ultraviolet setting resin which serves as a protective layer.

6. A method in accordance with claim 5, further comprising the step of:

adhering another transparent substrate onto the protective layer.

7. A method in accordance with claim 1, wherein growing said vacuum thin-film comprises a vacuum evaporation method.

8. A method in accordance with claim 1, wherein growing said vacuum thin-film comprises a sputtering method.

9. A method in accordance with claim 1, wherein growing said vacuum thin-film comprises a plasma chemical vapor deposition method.

10. A method of manufacturing an optical circuit comprising the steps of:

accumulating a waveguide material on a stamper having an optical device forming section by use of a vacuum thin-film growing method;

fixing a substrate on a surface of the accumulated waveguide material by use of an adhesive agent interposed therebetween;

solidifying the adhesive agent to integrate the accumulated waveguide material on the substrate; and separating the substrate and the accumulated waveguide material integrated with each other from the stamper to obtain an optical circuit in which an optical device is integrally formed on the waveguide material.

11. A method in accordance with claim 10, further comprisng the steps of:
  forming a buffer layer on the accumulated waveguide material before fixing the substrate; and
  fixing the substrate on a surface of the formed buffer layer.

12. A method in accordance with claim 10, further comprising the steps of:
  using an ultraviolet setting resin serving as said adhesive agent; and
  irradiating with an ultraviolet ray onto said ultraviolet setting resin through said transparent substrate to solidify the ultraviolet setting resin.

13. A method in accordance with claim 10, wherein the vacuum thin-film growing method is a vacuum evaporation method.

14. A method in accordance with claim 10, wherein the vacuum thin-film growing method is a sputtering method.

15. A method in accordance with claim 10, wherein the vacuum thin-film growing method is a plasma chemical vapor deposition method.

16. A method of manufacturing an optical circuit comprising the steps of:
  accumulating a waveguide material on a stamper having an optical device forming section by use of a vacuum thin-film growing method;
  forming a buffer layer on the accumulated waveguide material;
  fixing a substrate on a surface of the formed buffer layer by use of an adhesive agent interposed therebetween;
  solidifying the adhesive agent to integrate the accumulated waveguide material on the substrate; and
  separating the substrate and the accumulated waveguide material integrated with each other from the stamper to obtain an optical circuit in which an optical device is integrally formed on the waveguide material.

17. A method in accordance with claim 16, further comprising the steps of:
  using an ultraviolet setting resin as said adhesive agent; and
  irradiating said ultraviolet setting resin with an ultraviolet ray through said transparent substrate to solidify the ultraviolet setting resin.

18. A method in accordance with claim 16, wherein the vacuum thin-film growing method is a vacuum evaporation method.

19. A method in accordance with claim 16, wherein the vacuum thin-film growing method is a sputtering method.

20. A method in accordance with claim 16, wherein the vacuum thin-film growing method is a plasma chemical vapor deposition method.

* * * * *